United States Patent
Zhou et al.

(10) Patent No.: US 12,550,185 B2
(45) Date of Patent: Feb. 10, 2026

(54) CONFLICT AVOIDANCE BETWEEN RANDOM ACCESS MESSAGES AND OTHER TRANSMISSIONS

(71) Applicant: QUALCOMM INCORPORATED, San Diego, CA (US)

(72) Inventors: Yan Zhou, San Diego, CA (US); Tao Luo, San Diego, CA (US); Xiaoxia Zhang, San Diego, CA (US); Seyedkianoush Hosseini, San Diego, CA (US); Konstantinos Dimou, San Francisco, CA (US); Hamed Pezeshki, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 378 days.

(21) Appl. No.: 18/068,415

(22) Filed: Dec. 19, 2022

(65) Prior Publication Data

US 2023/0124072 A1    Apr. 20, 2023

Related U.S. Application Data

(62) Division of application No. 16/891,722, filed on Jun. 3, 2020, now Pat. No. 11,564,252.

(Continued)

(51) Int. Cl.
  *H04W 74/00*  (2009.01)
  *H04W 48/10*  (2009.01)
  (Continued)

(52) U.S. Cl.
  CPC ......... *H04W 74/002* (2013.01); *H04W 48/10* (2013.01); *H04W 56/0015* (2013.01);
  (Continued)

(58) Field of Classification Search
  None
  See application file for complete search history.

(56) References Cited

U.S. PATENT DOCUMENTS 10,327,265 B2  6/2019  Ly et al.
11,234,273 B2  1/2022  Islam et al.
(Continued)

FOREIGN PATENT DOCUMENTS

CN    109328484 A    2/2019
CN    109565808 A    4/2019
(Continued)

OTHER PUBLICATIONS

Huawei, et al., "Enhancement to Initial Access in NR Unlicensed", 3GPP Draft, 3GPP TSG RAN WG1 Meeting #97, R1-1906045, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727502, 14 pages, section 3.1, 1-6, first line, p. 6, paragraph [0005].
(Continued)

*Primary Examiner* — Jutai Kao
(74) *Attorney, Agent, or Firm* — Holland & Hart LLP

(57) ABSTRACT

Methods, systems, and devices for wireless communications are described. Interference between random access channel (RACH) transmissions and Industrial Internet of Things (IIoT) transmissions may be avoided with a RACH occasion forbidden mask and a dynamic indication of availability of downlink retransmission resources. A user equipment (UE) may receive an indication of a RACH configuration and a forbidden mask associated with the RACH configuration. The UE may identify, from a set of random access occasions indicated by the RACH configuration, a subset of allowed random access occasions based on the forbidden mask. The UE may transmit a random access message during at least (Continued)

one allowed random access occasion of the subset. Additionally or alternatively, a base station may determine whether one or more transmissions on a component carrier (CC) were successful, and transmit downlink control information (DCI) indicating whether a set of random access occasions are available on the CC.

26 Claims, 17 Drawing Sheets

Related U.S. Application Data

(60) Provisional application No. 62/877,279, filed on Jul. 22, 2019.

(51) Int. Cl.
*H04W 56/00* (2009.01)
*H04W 72/232* (2023.01)
*H04W 74/0833* (2024.01)

(52) U.S. Cl.
CPC ..... *H04W 72/232* (2023.01); *H04W 74/0833* (2013.01); *H04W 74/085* (2013.01)

(56) References Cited

U.S. PATENT DOCUMENTS

| | | | |
|---|---|---|---|
| 2017/0374686 A1 | 12/2017 | Agarwal et al. | |
| 2019/0069258 A1 | 2/2019 | Jeon et al. | |
| 2019/0306892 A1 | 10/2019 | Xiong et al. | |
| 2020/0275483 A1* | 8/2020 | Li | H04W 16/14 |
| 2021/0029738 A1 | 1/2021 | Zhou et al. | |
| 2021/0112602 A1* | 4/2021 | Li | H04W 72/0446 |
| 2021/0112604 A1 | 4/2021 | Bao et al. | |
| 2021/0337605 A1 | 10/2021 | Yuan et al. | |
| 2022/0038221 A1* | 2/2022 | Wong | H04L 1/188 |
| 2022/0086915 A1 | 3/2022 | Canonne-Velasquez et al. | |
| 2022/0104280 A1* | 3/2022 | Yang | H04W 74/0841 |

FOREIGN PATENT DOCUMENTS

| | | |
|---|---|---|
| CN | 109892001 A | 6/2019 |
| EP | 3048853 A1 | 7/2016 |
| WO | WO-2018031848 A1 | 2/2018 |
| WO | WO-2018084995 | 5/2018 |

OTHER PUBLICATIONS

Intel Corporation: "Remaining Details of PRACH Formats", 3GPP Draft, R1-1720061, PRACH Format, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369742, 11 pages, section 2.4; pp. 9-10.
International Preliminary Report on Patentability—PCT/US2020/036087, The International Bureau of WIPO—Geneva, Switzerland, Feb. 3, 2022.
International Search Report and Written Opinion—PCT/US2020/036087—ISA/EPO—Aug. 26, 2020.
3GPP TS 36.211: "3rd Generation Partnership Project, Technical Specification Group Radio Access Network, Evolved Universal Terrestrial Radio Access (E-UTRA), Physical Channels and Modulation (Release 12)", 3rd Generation Partnership Project, Mobile Competence Centre, 650, Route Des Lucioles, F-06921 Sophia-Antipolis Cedex, France, vol. RAN WG1, No. V12.3.0, Sep. 22, 2014, pp. 1-124, XP050925832.

\* cited by examiner

CONFLICT AVOIDANCE BETWEEN RANDOM ACCESS MESSAGES AND OTHER TRANSMISSIONS

CROSS REFERENCE

The present application for patent is a Divisional of U.S. patent application Ser. No. 16/891,722 by Zhou et al., entitled "CONFLICT AVOIDANCE BETWEEN RANDOM ACCESS MESSAGES AND OTHER TRANSMISSIONS," filed Jun. 3, 2020 which claims priority to U.S. Provisional Patent Application No. 62/877,279 by Zhou et al., entitled "CONFLICT AVOIDANCE BETWEEN RANDOM ACCESS MESSAGES AND OTHER TRANSMISSIONS," filed Jul. 22, 2019; each of which is assigned to the assignee hereof, and each of which is expressly incorporated by reference herein in its entirety.

BACKGROUND

The following relates generally to wireless communications, and more specifically to conflict avoidance between random access messages and other transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, various UEs may communicate with a base station using a combination of scheduled transmissions and random access procedures (e.g., random access channel (RACH) procedures). In such cases, a RACH occasion utilized by a first UE may collide with scheduled transmissions by one or more other UEs (e.g., as the first UE may not be aware of the scheduled transmissions). Thus, techniques to avoid such collisions may be desirable, and may be used to ensure communications efficiency and reliability in a system.

SUMMARY

The described techniques relate to improved methods, systems, devices, and apparatuses that support conflict avoidance between random access messages and other transmissions. Generally, the described techniques provide for conflict avoidance between RACH transmissions by a UE and scheduled Industrial Internet of Things (IIoT) transmissions by a base station and other UEs. The scheduled IIoT transmissions may be examples of semi-persistent scheduling (SPS) transmissions and configured grant (CG) transmissions, for example, in downlink transmissions by a base station and uplink transmissions by one or more UEs. A UE may transmit RACH communications in slots allocated for RACH transmissions (e.g., RACH occasions). However, the UE may be unaware of other transmissions, such as scheduled SPS and CG transmissions that may be scheduled to occur in the same slots. Interference between the RACH transmissions and the IIoT transmissions (e.g., SPS and CG transmissions) may be avoided through the use of a mask to preclude some RACH slots from RACH transmissions by a UE. The interference may also be avoided through a dynamic indication of slot availability, including dynamically indicating that downlink retransmission slots may be available for RACH transmissions without interference.

A method of wireless communication at a UE is described. The method may include receiving an indication of a random access channel configuration and a forbidden mask associated with the random access channel configuration, identifying, from a set of random access occasions indicated by the random access channel configuration, a subset of allowed random access occasions based on the forbidden mask, and transmitting a random access message during at least one allowed random access occasion of the subset.

An apparatus for wireless communication at a UE is described. The apparatus may include a processor, memory coupled with the processor, and instructions stored in the memory. The instructions may be executable by the processor to cause the apparatus to receive an indication of a random access channel configuration and a forbidden mask associated with the random access channel configuration, identify, from a set of random access occasions indicated by the random access channel configuration, a subset of allowed random access occasions based on the forbidden mask, and transmit a random access message during at least one allowed random access occasion of the subset.

Another apparatus for wireless communication at a UE is described. The apparatus may include means for receiving an indication of a random access channel configuration and a forbidden mask associated with the random access channel configuration, identifying, from a set of random access occasions indicated by the random access channel configuration, a subset of allowed random access occasions based on the forbidden mask, and transmitting a random access message during at least one allowed random access occasion of the subset.

A non-transitory computer-readable medium storing code for wireless communication at a UE is described. The code may include instructions executable by a processor to receive an indication of a random access channel configuration and a forbidden mask associated with the random access channel configuration, identify, from a set of random access occasions indicated by the random access channel configuration, a subset of allowed random access occasions based on the forbidden mask, and transmit a random access message during at least one allowed random access occasion of the subset.

Some examples of the method, apparatuses, and non-transitory computer-readable medium described herein may further include operations, features, means, or instructions for receiving a set of synchronization signal blocks (SSBs), selecting an SSB from the set of SSBs based on a signal quality of the SSB, and identifying, based on the selected SSB, a mapping to random access resources corresponding to the at least one allowed random access occasion.

In some examples of the method, apparatuses, and non-transitory computer-readable medium described herein, the set of SSBs indicate a mapping between the set of SSBs and the subset of allowed random access occasions.

In some examples of the method, apparatuses, and non-transitory computer-readable medium described herein, the set of SSBs indicate a mapping of the set of SSBs to the subset of allowed random access occasions and a subset of forbidden random access occasions of the set of random access occasions.

Some examples of the method, apparatuses, and non-transitory computer-readable medium described herein may further include operations, features, means, or instructions for identifying, from the set of random access occasions indicated by the random access channel configuration, a subset of forbidden random access occasions in accordance with the forbidden mask, where the subset of allowed random access occasions may be different from the subset of forbidden random access occasions.

In some examples of the method, apparatuses, and non-transitory computer-readable medium described herein, the subset of forbidden random access occasions corresponds to communications resources for one or more other UEs, the communications resources including semi-persistently scheduled communications resources, CG communications resources, downlink control information (DCI) based retransmission resources, or a combination thereof.

In some examples of the method, apparatuses, and non-transitory computer-readable medium described herein, the communications resources include a periodic transmission pattern for the one or more other UEs, and where respective allowed random access occasions of the subset of allowed random access occasions may be non-overlapping with the communications resources.

In some examples of the method, apparatuses, and non-transitory computer-readable medium described herein, receiving the forbidden mask may include operations, features, means, or instructions for receiving a system information block (SIB) indicating the forbidden mask.

A method of wireless communication at a UE is described. The method may include receiving DCI including an indication of whether a set of random access occasions are available on a component carrier, the set of random access occasions corresponding to resources reserved for potential transmission on the component carrier, and transmitting a random access message during at least one random access occasion of the set based on the DCI indicating that the set of random access occasions are available.

An apparatus for wireless communication at a UE is described. The apparatus may include a processor, memory coupled with the processor, and instructions stored in the memory. The instructions may be executable by the processor to cause the apparatus to receive DCI including an indication of whether a set of random access occasions are available on a component carrier, the set of random access occasions corresponding to resources reserved for potential transmission on the component carrier, and transmit a random access message during at least one random access occasion of the set based on the DCI indicating that the set of random access occasions are available.

Another apparatus for wireless communication at a UE is described. The apparatus may include means for receiving DCI including an indication of whether a set of random access occasions are available on a component carrier, the set of random access occasions corresponding to resources reserved for potential transmission on the component carrier, and transmitting a random access message during at least one random access occasion of the set based on the DCI indicating that the set of random access occasions are available.

A non-transitory computer-readable medium storing code for wireless communication at a UE is described. The code may include instructions executable by a processor to receive DCI including an indication of whether a set of random access occasions are available on a component carrier, the set of random access occasions corresponding to resources reserved for potential transmission on the component carrier, and transmit a random access message during at least one random access occasion of the set based on the DCI indicating that the set of random access occasions are available.

In some examples of the method, apparatuses, and non-transitory computer-readable medium described herein, receiving the DCI may include operations, features, means, or instructions for receiving the DCI on a second component carrier that may be different from the component carrier.

In some examples of the method, apparatuses, and non-transitory computer-readable medium described herein, the component carrier may be associated with communications in a first frequency range, and the second component carrier may be associated with communication in a second frequency range that may be different from the first frequency range.

Some examples of the method, apparatuses, and non-transitory computer-readable medium described herein may further include operations, features, means, or instructions for receiving, as part of the DCI, an indication of one or more respective component carriers that include the set of random access occasions.

In some examples of the method, apparatuses, and non-transitory computer-readable medium described herein, the resources reserved for potential transmission corresponding to the set of random access occasions may be preconfigured.

Some examples of the method, apparatuses, and non-transitory computer-readable medium described herein may further include operations, features, means, or instructions for identifying an offset between the DCI and a temporally first random access occasion of the set of random access occasions, where transmitting the random access message during the at least one random access occasion may be based on the offset.

In some examples of the method, apparatuses, and non-transitory computer-readable medium described herein, one or more of the resources reserved for potential transmission corresponding to the set of one or more random access occasions may be preconfigured.

In some examples of the method, apparatuses, and non-transitory computer-readable medium described herein, transmission on one or more of the resources reserved for potential transmission occurs or does not occur.

In some examples of the method, apparatuses, and non-transitory computer-readable medium described herein, transmission on one or more of the resources reserved for potential transmission includes a retransmission for a failed transmission.

A method of wireless communication at a base station is described. The method may include transmitting, to one or more UEs, an indication of a random access channel configuration and a forbidden mask associated with the random access channel configuration, where the forbidden mask indicates a subset of allowed random access occasions from a set of random access occasions indicated by the random access channel configuration and receiving, from a UE of the one or more UEs, a random access message during at least one allowed random access occasion of the subset.

An apparatus for wireless communication at a base station is described. The apparatus may include a processor, memory coupled with the processor, and instructions stored in the memory. The instructions may be executable by the processor to cause the apparatus to transmit, to one or more UEs, an indication of a random access channel configuration and a forbidden mask associated with the random access channel configuration, where the forbidden mask indicates a subset of allowed random access occasions from a set of random access occasions indicated by the random access channel configuration and receive, from a UE of the one or more UEs, a random access message during at least one allowed random access occasion of the subset.

Another apparatus for wireless communication at a base station is described. The apparatus may include means for transmitting, to one or more UEs, an indication of a random access channel configuration and a forbidden mask associated with the random access channel configuration, where the forbidden mask indicates a subset of allowed random access occasions from a set of random access occasions indicated by the random access channel configuration and receiving, from a UE of the one or more UEs, a random access message during at least one allowed random access occasion of the subset.

A non-transitory computer-readable medium storing code for wireless communication at a base station is described. The code may include instructions executable by a processor to transmit, to one or more UEs, an indication of a random access channel configuration and a forbidden mask associated with the random access channel configuration, where the forbidden mask indicates a subset of allowed random access occasions from a set of random access occasions indicated by the random access channel configuration and receive, from a UE of the one or more UEs, a random access message during at least one allowed random access occasion of the subset.

Some examples of the method, apparatuses, and non-transitory computer-readable medium described herein may further include operations, features, means, or instructions for configuring a mapping between a set of SSBs (SSBs) and the subset of allowed random access occasions, and transmitting, to the one or more UEs, the set of SSBs, where SSBs of the set of SSBs indicate the mapping, and where the random access message may be received based on the mapping.

Some examples of the method, apparatuses, and non-transitory computer-readable medium described herein may further include operations, features, means, or instructions for configuring a mapping of a set of SSBs to the subset of allowed random access occasions and a subset of forbidden SSBs, and transmitting, to the one or more UEs, the set of SSBs, where SSBs of the set of SSBs indicate the mapping, and where the random access message may be received based on the mapping.

Some examples of the method, apparatuses, and non-transitory computer-readable medium described herein may further include operations, features, means, or instructions for identifying, from the set of random access occasions indicated by the random access channel configuration, a subset of forbidden random access occasions, where the subset of allowed random access occasions may be different from the subset of forbidden random access occasions.

In some examples of the method, apparatuses, and non-transitory computer-readable medium described herein, the subset of forbidden random access occasions corresponds to communications resources for one or more other UEs, the communications resources including semi-persistently scheduled communications resources, CG communications resources, DCI-based retransmission resources, or a combination thereof.

In some examples of the method, apparatuses, and non-transitory computer-readable medium described herein, the communications resources include a periodic transmission pattern for the one or more other UEs, and where respective allowed random access occasions of the subset of allowed random access occasions may be non-overlapping with the communications resources.

In some examples of the method, apparatuses, and non-transitory computer-readable medium described herein, transmitting the forbidden mask may include operations, features, means, or instructions for transmitting an SIB that indicates the forbidden mask.

A method of wireless communication at a base station is described. The method may include determining whether one or more transmissions on a component carrier were successful, transmitting DCI including an indication of whether a set of random access occasions are available on the component carrier, the set of random access occasions corresponding to resources reserved for potential transmission on the component carrier, where the indication is based on the determination, and receiving, from a UE, a random access message during at least one random access occasion of the set based on the DCI indicating that the set of random access occasions are available.

An apparatus for wireless communication at a base station is described. The apparatus may include a processor, memory coupled with the processor, and instructions stored in the memory. The instructions may be executable by the processor to cause the apparatus to determine whether one or more transmissions on a component carrier were successful, transmit DCI including an indication of whether a set of random access occasions are available on the component carrier, the set of random access occasions corresponding to resources reserved for potential transmission on the component carrier, where the indication is based on the determination, and receive, from a UE, a random access message during at least one random access occasion of the set based on the DCI indicating that the set of random access occasions are available.

Another apparatus for wireless communication at a base station is described. The apparatus may include means for determining whether one or more transmissions on a component carrier were successful, transmitting DCI including an indication of whether a set of random access occasions are available on the component carrier, the set of random access occasions corresponding to resources reserved for potential transmission on the component carrier, where the indication is based on the determination, and receiving, from a UE, a random access message during at least one random access occasion of the set based on the DCI indicating that the set of random access occasions are available.

A non-transitory computer-readable medium storing code for wireless communication at a base station is described. The code may include instructions executable by a processor to determine whether one or more transmissions on a component carrier were successful, transmit DCI including an indication of whether a set of random access occasions are available on the component carrier, the set of random access occasions corresponding to resources reserved for potential transmission on the component carrier, where the indication is based on the determination, and receive, from a UE, a random access message during at least one random access occasion of the set based on the DCI indicating that the set of random access occasions are available.

In some examples of the method, apparatuses, and non-transitory computer-readable medium described herein, transmitting the DCI may include operations, features, means, or instructions for broadcasting, to one or more UEs, the DCI on a second component carrier that may be different from the component carrier.

In some examples of the method, apparatuses, and non-transitory computer-readable medium described herein, the component carrier may be associated with communications in a first frequency range, and the second component carrier may be associated with communication in a second frequency range that may be different from the first frequency range.

Some examples of the method, apparatuses, and non-transitory computer-readable medium described herein may further include operations, features, means, or instructions for transmitting, as part of the DCI, an indication of one or more respective component carriers that include the set of random access occasions.

In some examples of the method, apparatuses, and non-transitory computer-readable medium described herein, the resources reserved for potential transmission corresponding to the set of random access occasions may be preconfigured.

Some examples of the method, apparatuses, and non-transitory computer-readable medium described herein may further include operations, features, means, or instructions for identifying an offset between the DCI and a temporally first random access occasion of the set of random access occasions, where receiving the random access message during at the least one random access occasion may be based on the offset.

In some examples of the method, apparatuses, and non-transitory computer-readable medium described herein, the one or more transmissions include semi-persistently scheduled communications, CG communications, or a combination thereof.

DETAILED DESCRIPTION

Figure 1:
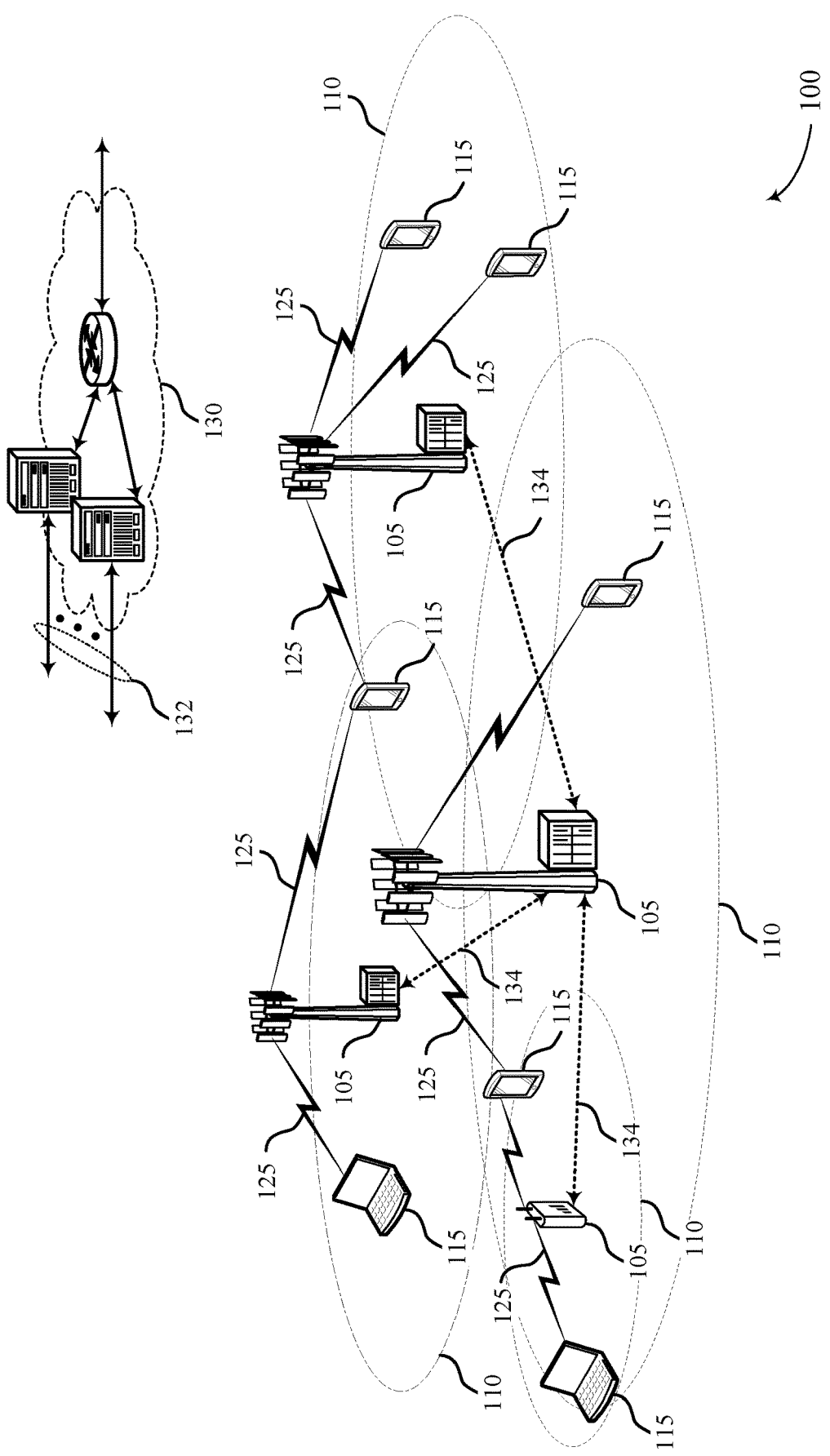
FIG. 1 illustrates an example of a system for wireless communications that supports conflict avoidance between random access messages and other transmissions in accordance with aspects of the present disclosure.

A RACH is a channel in which a UE may transmit signals for communicating with a base station without prior scheduling. For example, rather than communicating on designated resources for a particular UE, the UE may communicate in a channel designated for non-scheduled communications for multiple UEs in a network.

A base station may use SPS to schedule transmissions for multiple slots for one or more UEs to use for uplink transmissions. A base station may transmit a single message to one or more UEs, where the message indicates some scheduled resources for those UEs to use for uplink transmissions to the base station. In other cases, the base station may use CG transmissions or DCI transmissions to schedule uplink transmissions for the UEs. The base station may also indicate occasions of potential transmission by the base station in DCI or other control signaling. Potential transmissions may be initial transmissions by the base station or retransmissions.

Therefore, resources in a frequency range or component carrier (CC) may be allocated as resources scheduled for specific transmissions by a UE or a base station (e.g., in the case of downlink SPS or CG scheduling by the base station, retransmission by a base station, or uplink transmissions by UEs in scheduled resources). Other resources, such as a RACH channel within a CC, may be available for unscheduled uplink transmissions by UEs. Thus, unscheduled transmissions in RACH occasion slots may interfere with scheduled transmissions by other UEs or by the serving base station. These scheduled transmissions by other UEs and base stations may be examples of IIoT traffic related transmissions, and may be described as such herein.

There may be a number of slots within a subcarrier that are allocated for or available for RACH transmissions. These slots may be described as RACH occasions. In a particular CC, there may be a set number of RACH configurations depending on the frequency range associated with the CC. A RACH slot may be used by a UE to initiate a random access procedure with a base station. The first step in a random access procedure may be the transmission of a physical random access channel (PRACH) preamble by a UE. The initiation of a random access procedure by a UE with the transmission of a PRACH preamble may occur on any RACH occasion, and therefore may affect or interfere with other communications, including scheduled downlink transmissions by base stations and scheduled uplink transmissions by other UEs. These communications may include IIoT traffic that may also occur during the slot coinciding with the RACH occasion slot used by the UE to transmit the PRACH preamble.

To avoid conflict between RACH occasions and IIoT traffic, different RACH configurations may be defined depending on the particular IIoT traffic pattern for the channel. That is, different RACH configurations may be applied to any existing RACH configuration based on the IIoT traffic pattern. The RACH configuration pattern may be updated so that RACH occasion slots may not overlap with scheduled uplink/downlink slots, or overlap less often. This may therefore decrease the interference between RACH transmissions and scheduled uplink/downlink transmissions.

Additionally or alternatively, a mask (e.g., a RACH occasion forbidden mask) may be applied to an existing RACH configuration. A forbidden mask may indicate whether RACH occasions are not to be used by a UE for RACH transmissions. A RACH forbidden mask may be applied to avoid RACH occasion slot transmissions interfering with an IIoT traffic period (such as uplink and downlink transmissions scheduled by SPS or CG communications) by notifying the UE that it is not to transmit RACH messages during RACH occasions marked as forbidden by the mask. Further, SSB mapping to RACH occasions may continue on RACH occasions that are indicated as allowed.

Additionally or alternatively, at least some RACH occasions may be dynamically activated if there are no retransmissions scheduled to occur in those slots. For example, a base station may transmit an initial SPS or CG communication to scheduled uplink communications by one or more UEs. If the transmission by the base station is successful, the base station may not use slots allocated for retransmissions, and thus the retransmission slots are available for RACH transmissions by a UE, as the RACH transmissions may not interfere with other IIoT associated retransmissions.

Aspects of the disclosure are initially described in the context of a wireless communications system. Aspects of the disclosure are further described with respect to other wireless communications systems, transmission configurations, and process flow diagrams. Aspects of the disclosure are further illustrated by and described with reference to apparatus diagrams, system diagrams, and flowcharts that relate to conflict avoidance between random access messages and other transmissions.

FIG. 1 illustrates an example of a wireless communications system 100 that supports conflict avoidance between random access messages and other transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS, SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical hybrid-ARQ indicator channel (PHICH) configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1, and SIB2 prior to accessing the network. The MIB may be transmitted on PBCH and may utilize the first 4 OFDMA symbols of the second slot of the first subframe of each radio frame. It may use the middle 6 RBs (72 subcarriers) in the frequency domain. The MIB carries a few important pieces of information for UE initial access, including, but not limited to, downlink channel bandwidth in term of RBs, PHICH configuration (duration and resource assignment), and SFN. A new MIB may be broadcast every fourth radio frame (e.g., SFN mod 4=0) at and rebroadcast every frame (e.g., 10 ms). Each repetition is scrambled with a different scrambling code. After reading an MIB (e.g., a new version or a copy), the UE 115 may try different phases of a scrambling code until it gets a successful CRC check. The phase of the scrambling code (0, 1, 2, or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (e.g., SFN mod 8=0) and rebroadcast every other frame (e.g., 20 ms). SIB1 includes access information, including cell identity information, and may indicate whether a UE is allowed to camp on a cell. SIB1 also includes cell selection information (or cell selection parameters). Additionally, SIB1 may include scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames, among other examples.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary C-RNTI. The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

A base station 105 may transmit SPS and CG downlink transmissions to schedule uplink transmissions to one or more UEs 115 within a coverage area 110. In some cases, the SPS and CG transmissions may be successfully received by the UEs, and in other cases the base station 105 may retransmit SPS and CG transmissions. The base station may indicate a scheduling of uplink, downlink, and retransmissions by transmitting scheduling information to one or more UEs 115. UEs 115 may transmit uplink transmissions according to the SPS and CG scheduled transmissions, after receiving SPS and CG scheduling from a base station 105.

Some UEs 115 may initiate a RACH procedure with a base station 105 by first transmitting a PRACH preamble to a base station 105. UE 115 may transmit the PRACH preamble on a slot of a carrier that is designated as a RACH occasion slot based on a PRACH configuration index. In some cases, the RACH transmission by the UE 115 may interfere with a downlink transmission or retransmission by a base station 105 (e.g., a transmission or a retransmission of SPS or CG scheduling) or a scheduled uplink transmission by another UE. In some cases, the PRACH configuration index may be referred to as a RACH configuration index.

Figure 2:
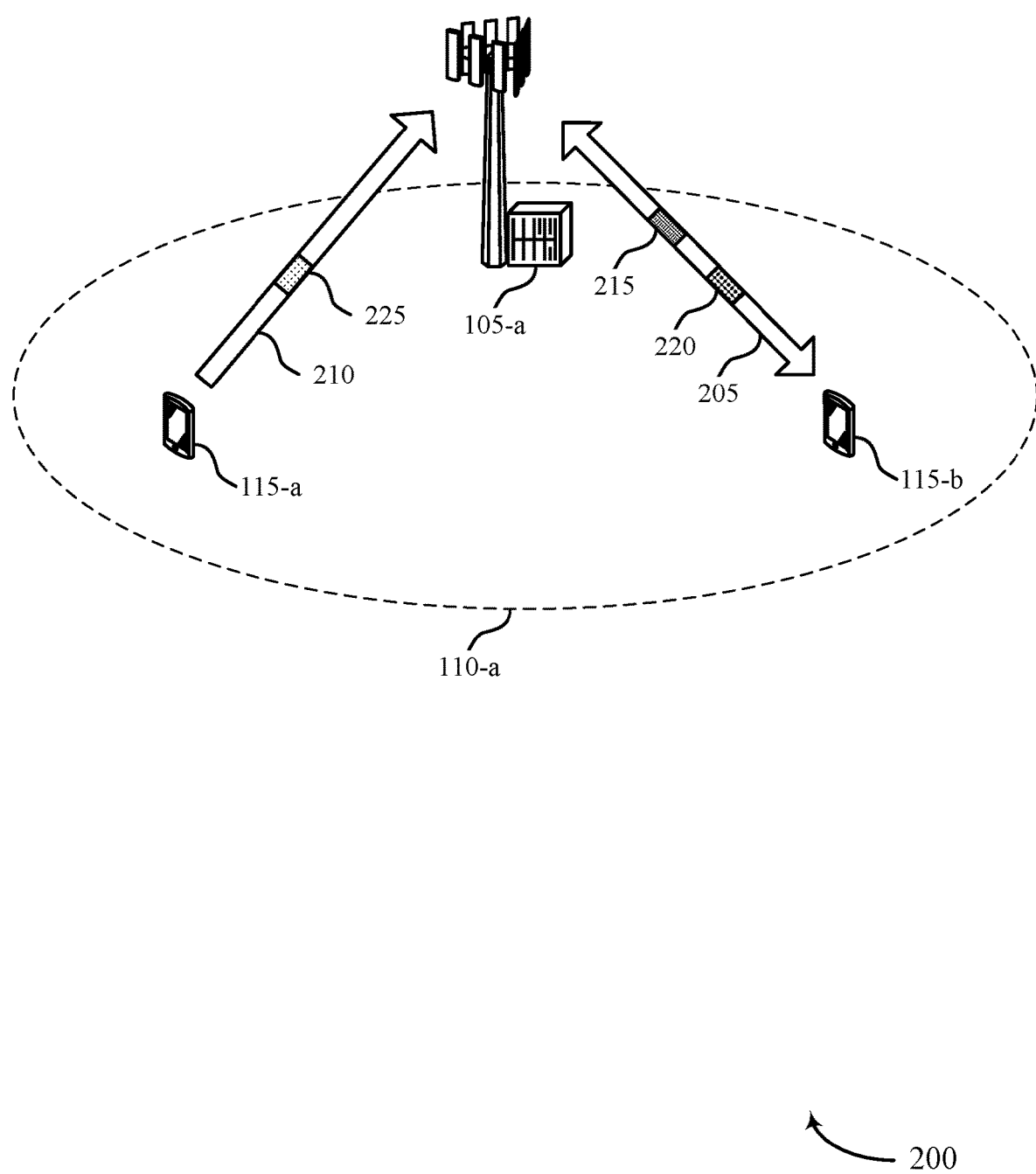
FIG. 2 illustrates an example of a wireless communications system that supports conflict avoidance between random access messages and other transmissions in accordance with aspects of the present disclosure.

FIG. 2 illustrates an example of a wireless communications system 200 that supports conflict avoidance between random access messages and other transmissions in accordance with aspects of the present disclosure. In some examples, wireless communications system 200 may implement aspects of wireless communications system 100. Wireless communications system 200 may include base station 105-a, UE 115-a, and UE 115-b, which may be examples of base stations 105 and UEs 115 as described with reference to FIG. 1. Base station 105-a may serve geographic coverage area 110-a. Base station 105-a may communicate with UEs 115 by transmitting signaling in transmission channels 205 and 210.

Base station 105-a may transmit configuration information to a UE 115, including information (such as DCI) transmitted in a physical downlink control channel (PDCCH). Base station 105-a may also transmit downlink messages such as SPS and CG scheduling information within channel 205. Transmissions of SPS and CG messages 215 by base station 105-a may occur during certain subframes, and in certain slots allocated for downlink transmissions for certain subcarriers. These transmissions may be examples of periodic IIoT traffic communications.

In some cases, these transmissions by base station 105-a may be successfully transmitted to a UE 115, and in other cases the transmissions may not be successfully transmitted to a UE 115. In cases where the transmission is unsuccessfully received, base station 105-a may transmit the signal again in retransmission messages in channel 205 at a later time and in a different slot, which may be allocated as a downlink retransmission slot. One or more UEs 115 may transmit uplink messages 220 in channel 205 based on the scheduling information received from the base station 105-a (such as SPS and CG messages 215 from base station 105-a). For example, UE 115-b may transmit an uplink SPS message 220 in channel 205 or UE 115-b may transmit an uplink CG message 220 using channel 205 to communicate with base station 105-a.

UE 115-a may receive one or more SSBs that indicate a RACH configuration (e.g., indicated by a PRACH configuration index). The RACH configuration may provide a preamble format and may map to a RACH occasion for random access procedures for the UE 115 to use to initiate a RACH procedure. UE 115-a may utilize a RACH occasion to initiate a RACH procedure without awareness of other transmissions by other UEs 115. The transmissions by other UEs may occur within the same slot as the RACH occasion opportunistically used by UE 115-a.

In many cases, a UE 115 may transmit messaging (e.g., message 225) in transmission channel 210. Message 225 may correspond to a RACH transmission and may occur in a RACH occasion slot. There may be a number of RACH configurations associated with different frequency bands and CCs. In a particular CC, there may be number of different possible RACH configurations (e.g., corresponding to different frequencies of RACH slots) depending on the frequency range associated with the CC. For example, a CC corresponding to frequency range FR2 (24.250 GHz-52.600 GHz, e.g., mmW) may, in some cases, include 256 different RACH configurations. Other CCs and frequency ranges may correspond to a different number of potential RACH configurations. Different RACH configurations may correspond to a different number of slots in a channel being available for RACH transmissions (which may be referred to as a RACH occasion). Different RACH configurations may be denoted by different index numbers. Base station 105-a may transmit an indication of the RACH configuration (e.g., as a PRACH configuration index) to one or more UEs 115.

Regardless of the density of the RACH occasions as determined by the PRACH configuration index, transmissions in RACH occasion slots may collide with IIoT traffic such as SPS and CG scheduled uplink and downlink transmissions between serving base station 105-a and other UEs 115 (e.g., UE 115-b). PRACH transmissions by UE 115-a may occur on any configured RACH occasion slot, and thus may impact or interfere with any IIoT traffic scheduled for that slot. IIoT traffic may include SPS transmissions, CG transmissions, or DCI-based retransmissions by base station 105-a, or scheduled uplink transmissions by other UEs 115 (such as UE 115-b) that may correspond to signaling in SPS, CG, and DCI downlink messages from base station 105-a. UE 115-a may determine to opportunistically use a RACH occasion slot for the initiation of a RACH procedure, and UE 115-a may not have received information from base station 105-a about other transmissions by other UEs 115 (e.g., UE 115-b) that may be scheduled to occur in the same slot.

To avoid interference between RACH occasion slot transmissions by UE 115-a and IIoT transmissions by base station 105-a and UE 115-b, a RACH occasion forbidden mask may be applied to the RACH configuration. An indication of a RACH occasion forbidden mask may be transmitted by base station 105-a to one or more UEs 115 within signaling that indicates higher layer parameters. The RACH occasion forbidden mask may, for example, be included in the higher layer parameter prach-ConfigurationIndex. The RACH occasion forbidden mask may in some cases not impact the preconfigured RACH occasion configuration, but may indicate that RACH transmissions may be precluded (e.g., forbidden) in a slot, even if the slot is configured for RACH transmissions. This may decrease the possibility of RACH transmissions interfering with IIoT traffic, because the UE 115 may not transmit RACH transmissions during a slot that may be used for IIoT transmissions by base station 105-a.

In some cases, the mask may preclude all RACH occasion slots for a certain time period or a certain number of subframes or radio frames. In other cases, the mask may be based on the scheduled IIoT traffic pattern. The IIoT traffic pattern may be periodic, and some IIoT transmissions may overlap with RACH occasion slots, and some IIoT transmissions may not overlap with RACH occasion slots. Thus, the mask may preclude particular RACH occasion slots that interfere with IIoT transmissions, rather than precluding all RACH occasions slots for a period of time. The mask may also be dynamically applied depending on dynamic IIoT traffic patterns or changes to the PRACH configuration index indicating the pattern of RACH occasion slots.

Additionally or alternatively, RACH configurations may be defined dynamically depending on the IIoT traffic pattern (e.g., the transmission pattern of SPS transmissions, CG transmissions, and retransmissions of SPS and CG transmissions as signaled and defined in the DCI). This may include a RACH configuration where RACH occasion slots may be dynamically activated based on the retransmission status of those slots. For example, if an initial IIoT transmission (e.g., an SPS or CG transmission) is successful for all UEs 115 on a CC (e.g., UEs 115-a and 115-b), base station 105-a may transmit DCI in channel 205 to the UEs 115 to activate the RACH occasions in the slots that would have been used for retransmission of the initial IIoT transmission (such as the SPS or the CG transmission). Thus, there may be a lower likelihood of interference between the RACH transmission by the UE 115-a and an IIoT transmission, because the RACH transmission by the UE may be transmitted in a slot in which there are no IIoT transmissions, due to the lack of retransmission.

Figure 3:
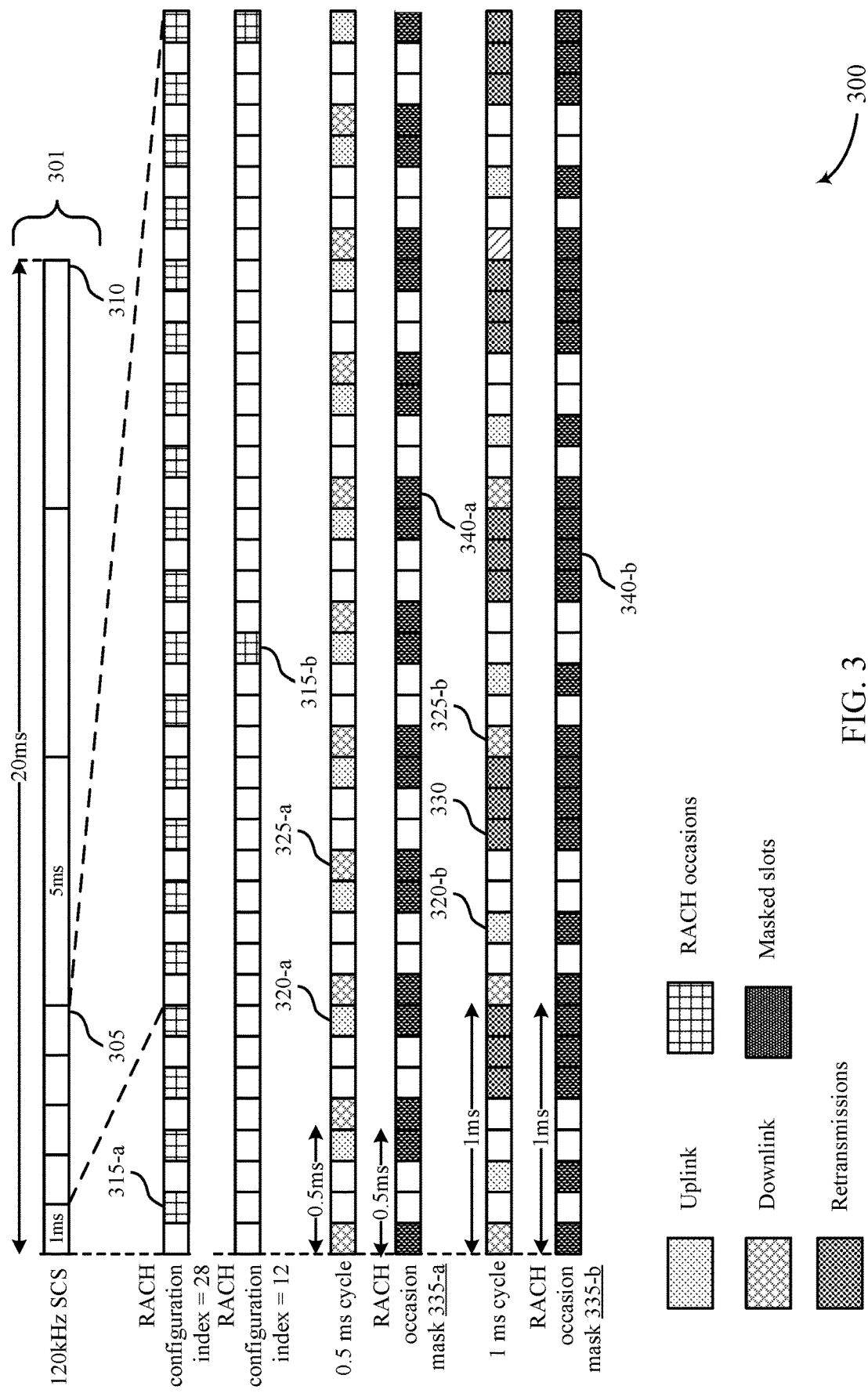
FIG. 3 illustrates an example of a transmission configuration that supports conflict avoidance between random access messages and other transmissions in accordance with aspects of the present disclosure.

FIG. 3 illustrates an example of a transmission configuration 300 that supports conflict avoidance between random access messages and other transmissions in accordance with aspects of the present disclosure. In some examples, transmission configuration 300 may implement aspects of wireless communications systems 100 and 200. Base stations 105 and UEs 115 as described with respect to FIGS. 1 and 2 may transmit signaling according to the slots as defined in transmission configuration 300.

A radio frame may be used in a wireless communications system, and may be described herein with respect to a set of two radio frames 301. A radio frame may correspond to some time and frequency parameters depending on the radio access technology (RAT), sub-carrier spacing (SCS), and other parameters. For example, in the CC corresponding to FR2 (e.g., mmW frequency range), a radio frame may be defined with an SCS of 120 kHz. An SCS of 120 kHz may correspond to a Numerology of 3, which may correspond to a configuration of 8 slots per subframe 305. Each subframe 305 may be 1 ms, and thus a radio frame of ten subframes may be 10 ms in length. Thus, the full radio frame may include 80 slots. A 20 ms time as shown as 301 may therefore include two radio frames, each including ten subframes, shown in groups of five subframes 310 and 80 slots. The timing and frequency of transmission configuration 300 may be an example of one particular time and frequency configuration, but the method as described herein may apply to other time and frequency configurations.

A base station 105 may transmit downlink transmissions in slots 325 to one or more UEs 115. Downlink transmissions may include SPS transmissions, CG transmissions, DCI transmissions, and other control and data transmissions. In some cases, UEs 115 may successfully receive the transmissions, and in some cases the base station 105 may retransmit the downlink transmissions in retransmission slots 330. UEs 115 may transmit uplink transmissions in response to the SPS, CG, DCI, and other control and data information from the base station 105. These uplink transmissions may occur in scheduled transmissions in uplink slots 320. Uplink and downlink transmissions, including retransmissions, in scheduled slots 320, 325, and 330, may be examples of IIoT traffic.

Certain slots within a subframe 305 of a radio frame may be configured for uplink transmissions, downlink transmissions, retransmissions, or RACH occasions. Some uplink and downlink transmission slot patterns may be configured on a 0.5 ms cycle, while some uplink and downlink transmission slot patterns may be configured on a 1 ms cycle, or other cycle lengths. In the case of the 0.5 ms cycle, the pattern of uplink slots 320-a and downlink slots 325-a may repeat every 0.5 ms, as shown in transmission configuration 300. In the case of a 1 ms cycle, the pattern of uplink slots 320-b and downlink slots 325-b may repeat every 1 ms. Some transmission patterns may also include designated slots for retransmissions, as shown by retransmission slots 330 in the 1 ms cycle pattern in transmission configuration 300. In some cases, transmissions by a UE according to a PRACH configuration index (e.g., in RACH occasion slots 315) may interfere with uplink transmissions in uplink slots 320 by another UE 115, downlink transmissions in downlink slots 325, and retransmissions in retransmission slots 330 by a base station 105.

The interference may correspond to the RACH occasion slot location, which may be defined by the PRACH configuration index. Each slot within a subframe 305 may or may not be configured for a RACH occasion. Whether a slot is configured as a RACH occasion may depend on the RACH configuration applied to the CC. The RACH configuration may be determined based on a PRACH configuration index, which may be defined by a number which corresponds to a pattern of RACH occasions per subframe. The PRACH configuration index may be determined according to an SIB parameter (e.g., prach-ConfigIndex). The number of different RACH configurations may also depend on the frequency range of the CC. For example, the frequency range FR2 (mmW) may be configured for 256 different RACH occasion configurations.

For example, PRACH configuration index 28 may correspond to a RACH occasion pattern in which alternating slots 315-a in a subframe 305 correspond to RACH occasion slots. In other words, a PRACH preamble may be transmitted by a UE 115 in slots "0, 2, 4, 6, 8" of an 8-slot subframe. Therefore, in PRACH configuration index 28 in transmission configuration 300, slots 315-a may be slots with RACH occasions. RACH occasion slots may be slots available for transmission of a PRACH preamble by a UE 115, which may be transmitted in order to initiate a random access procedure.

In another example, PRACH configuration index 12 may indicate that a RACH occasion may be configured less frequently. The PRACH configuration index 12 may correspond to a RACH occasion slot 315-*b* that occurs twice per radio frame, or once per 5 subframes 305.

The 0.5 ms cycle as shown in transmission configuration 300 includes a repeating pattern of uplink slots 320-*a* and downlink slots 325-*a*. Uplink slots 320-*a* may in some cases overlap with RACH occasion slots 315. Thus, RACH transmissions by a UE in RACH occasion slots 315 may interfere with IIoT transmissions by other UEs 115 in uplink slots 320.

The 1 ms cycle as shown in transmission configuration 300 includes a repeating pattern of uplink slots 320-*b*, downlink slots 325-*b*, and retransmission slots 330. Retransmission slots 330 may in some cases overlap with RACH occasion slots 315, regardless of the RACH occasion frequency and the PRACH configuration index. As shown in transmission configuration 300, retransmission slots 330 in the 1 ms cycle example may overlap with RACH occasion slots 315-*a* in the PRACH configuration index 28 and with RACH occasion slots 315-*b* in the PRACH configuration index 12. Thus, if a UE 115 transmits on a RACH occasion slot 315 (e.g., by transmitting a PRACH preamble) that overlaps with a retransmission by a base station 105 during a retransmission slot 330, there is a possibility of interference between the RACH transmission by the UE 115 and the IIoT retransmission by the base station 105.

Regardless of the frequency of RACH occasion slots 315 in a sub-carrier, RACH transmissions by a UE 115 may interfere with IIoT transmissions by other UEs 115 and base station 105, as well as retransmissions by a base station 105. Unlike SSB transmissions scheduled by a base station 105, RACH transmissions by a UE 115 may be transmitted at any time in a RACH occasion slot 315 and may not necessarily be scheduled, which may further cause interference and communication disruptions, leading to inefficiencies and increased retransmissions by both base station 105 and UEs 115. A RACH transmission by a UE 115 during a RACH occasion slot 315 may occur during the same time as a retransmission slot 330 including an IIoT retransmission by a base station 105. In this case, the transmission by the UE 115 and the base station 105 may interfere, and neither transmission may be received correctly by the other wireless device.

In order to avoid interference between RACH transmissions by a UE 115 and IIoT transmissions by UEs 115 and base stations 105, a RACH occasion forbidden mask may be applied to the existing RACH configuration. In this case, a base station 105 may transmit an indication of the PRACH configuration index (e.g., PRACH configuration index 28 or PRACH configuration index 12) to a UE 115 and the base station 105 may also indicate, to the UE 115, an indication of the RACH occasion mask 335 (e.g., a RACH forbidden mask) that corresponds to each PRACH configuration index and to each configured time cycle and pattern of uplink slots 320, downlink slots 325, and retransmission slots 330. For example, for the transmission configuration according to a 0.5 ms cycle, the base station may transmit an indication of RACH occasion mask 335-*a*. This mask may preclude a portion of slots 340-*a* or all slots 340-*a* from RACH occasions transmissions by a UE 115.

The RACH forbidden mask may indicate that RACH occasion slots 315 are not available for RACH transmissions by a UE 115, even if the PRACH configuration index indicates slots that are available for RACH transmissions by a UE 115. Thus, the UE 115 may not transmit RACH occasions during the slots precluded by the RACH occasion mask 335-*a* (e.g., a PRACH forbidden mask), and interference between RACH transmissions by a UE 115 and IIoT transmissions by a base station may be avoided. A combination of uplink slots 320, downlink slots 325, and retransmission slots 330 may be marked by the PRACH forbidden mask as precluded (e.g., forbidden), and thus the corresponding RACH occasion slot 315 may not be used for transmissions by a UE 115. In some cases, all RACH occasion slots 315 may be precluded by RACH occasion mask 335-*a* for a time period, and in other cases some slots 340 may remain available for use by the UE 115 for RACH transmissions (such as the transmission of a PRACH preamble). The preclusion of RACH occasion slots 315 with a RACH occasion mask 335 may decrease the possibility of interference between RACH transmissions by a UE 115 and IIoT transmissions by a base station 105.

In another example, a base station 105 may transmit an indication of RACH occasion mask 335-*b*, which may apply to transmission configuration patterns operating according to a 1 ms cycle. In this case, RACH occasion mask 335-*b* may preclude some or all RACH occasion slots 315 by masking transmission slots 340-*b* according to the transmission pattern of uplink slots 320-*b*, downlink slots 325-*b*, and retransmission slots 330. In these cases, interference between RACH transmissions in slots 315 by a UE 115 and IIoT transmissions by base station 105 and other UEs 115 may be avoided.

Figure 4:
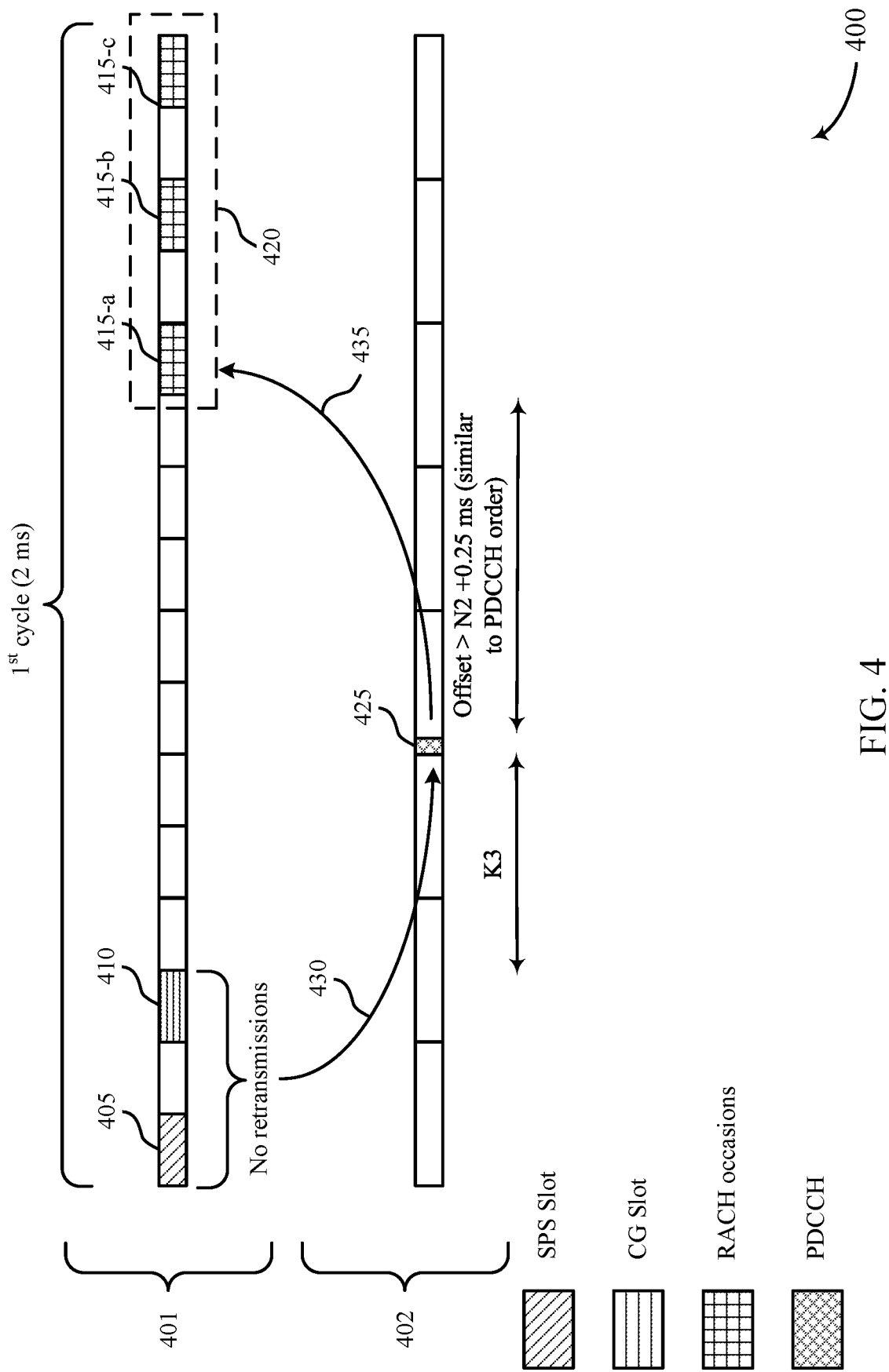
FIG. 4 illustrates an example of a transmission configuration that supports conflict avoidance between random access messages and other transmissions in accordance with aspects of the present disclosure.

FIG. 4 illustrates an example of a transmission configuration 400 that supports conflict avoidance between random access messages and other transmissions in accordance with aspects of the present disclosure. In some examples, transmission configuration 400 may implement aspects of wireless communications system 100. Base stations 105 and UEs 115 as described with respect to FIGS. 1 and 2 may transmit signaling according to the slots as defined in transmission configuration 400.

In another case, interference between RACH transmissions by a UE 115 and a base station 105 may be avoided by dynamically updating available RACH occasion slots. For example, a cause of interference between RACH transmissions by a UE 115 and transmissions by a base station 105 may be a slot timing of the retransmission slots 420 by a base station 105. Thus, if a retransmission of an IIoT transmission or another signal does not occur or is not scheduled to occur, the UE 115 may transmit RACH transmissions during those slots without causing interference.

For example, a base station 105 may transmit an SPS signal at 405 in a first CC 401. The first CC 401 may correspond to a frequency range. For example, the first CC may correspond to FR2 (mmW frequency range), and an SCS of 120 kHz. The base station may also transmit a CG signal 410 in CC 401. The base station 105 may transmit both SPS signal 405 and CG signal 410 to one or more UEs 115. If the one or more UEs 115 receive signals 405 and 410 correctly, then the signals 405 and 410 may not need to be retransmitted. Thus, the slots 420 that may previously have been allocated for an SPS signal retransmission (based on SPS signal 405) and a CG signal retransmission (based on CG signal 410) may not include transmission by a base station 105 (e.g., IIoT transmissions). Thus, the retransmission slots (e.g., slots included in 420) may be available for a RACH occasion transmissions by a UE 115.

Based on information 430 that SPS signal 405 and/or CG signal 410 will not be retransmitted, a base station 105 may transmit a PDCCH 425 to one or more UEs 115 within a coverage area 110. The PDCCH 425 may include DCI, and may be transmitted on a second CC 402. In some implementations, CC 402 may correspond to frequency range FR1 (e.g., sub-6 frequency range). In some examples, the DCI may be sent on a different CC, e.g., in FR1, as broadcast for both connected and idle UEs. In some examples, the DCI may indicate which one or more CCs have activated RACH occasions, and the locations of the RACH occasions may be pre-configured, signaled by a base station, etc. In some examples, CC 402 may correspond to a subcarrier spacing of 60 kHz. The PDCCH 425 may be transmitted by a base station after a delay of K (e.g., K3) after the successful initial transmission of SPS signal 405 and/or CG signal 410. The PDCCH 425 may include DCI, which may indicate 435 to one or more UEs 115 that certain slots 415 are available for RACH occasions transmissions, because there will be no IIoT transmissions by the base station 105 during those slots 415 (due to the lack of retransmissions). The PDCCH 425 transmitted by a base station 105 may indicate slots 415 that are available after a delay, or after an offset. For example, the offset may be greater than N2+0.25 ms, or an offset that may be similar to the PDCCH order-based RACH.

Thus, one UE 115 may transmit a PRACH preamble or other RACH signaling during one or more of available slots 415-*a*, 415-*b*, and 415-*c* (which may previously have been designated as retransmission slots 420 for IIoT transmissions by a base station 105). Additionally or alternatively, different UEs 115 may each transmit PRACH preamble or other RACH transmissions during each available slot 415. For example, a first UE 115 may transmit a first PRACH preamble during available slot 415-*a*, a second UE 115 may transmit a PRACH preamble during available slot 415-*b*, a third UE 115 may transmit a PRACH preamble during available slot 415-*c*, and so on. Each of the PRACH preambles transmitted by one or more UEs 115 may be transmitted to a base station 105. Therefore, the RACH transmissions by UEs 115 may not cause interference with IIoT transmissions by a base station 105, because the RACH transmissions may be transmitted by the UE 115 during slots that are not used for IIoT retransmission by the base station 105. The lack of IIoT transmission by the base station 105 during slots 420 may be due to the lack of necessary IIoT retransmissions by the base station 105 during slots 420.

In some cases, a resource allocated for retransmission slots may also be an example of a potential transmission slot. In some examples, a potential transmission may be an initial transmission or a retransmission. In the method described herein, a base station 105 may also transmit DCI indicating an availability of one or more resources reserved for one or more potential transmissions.

Figure 5:
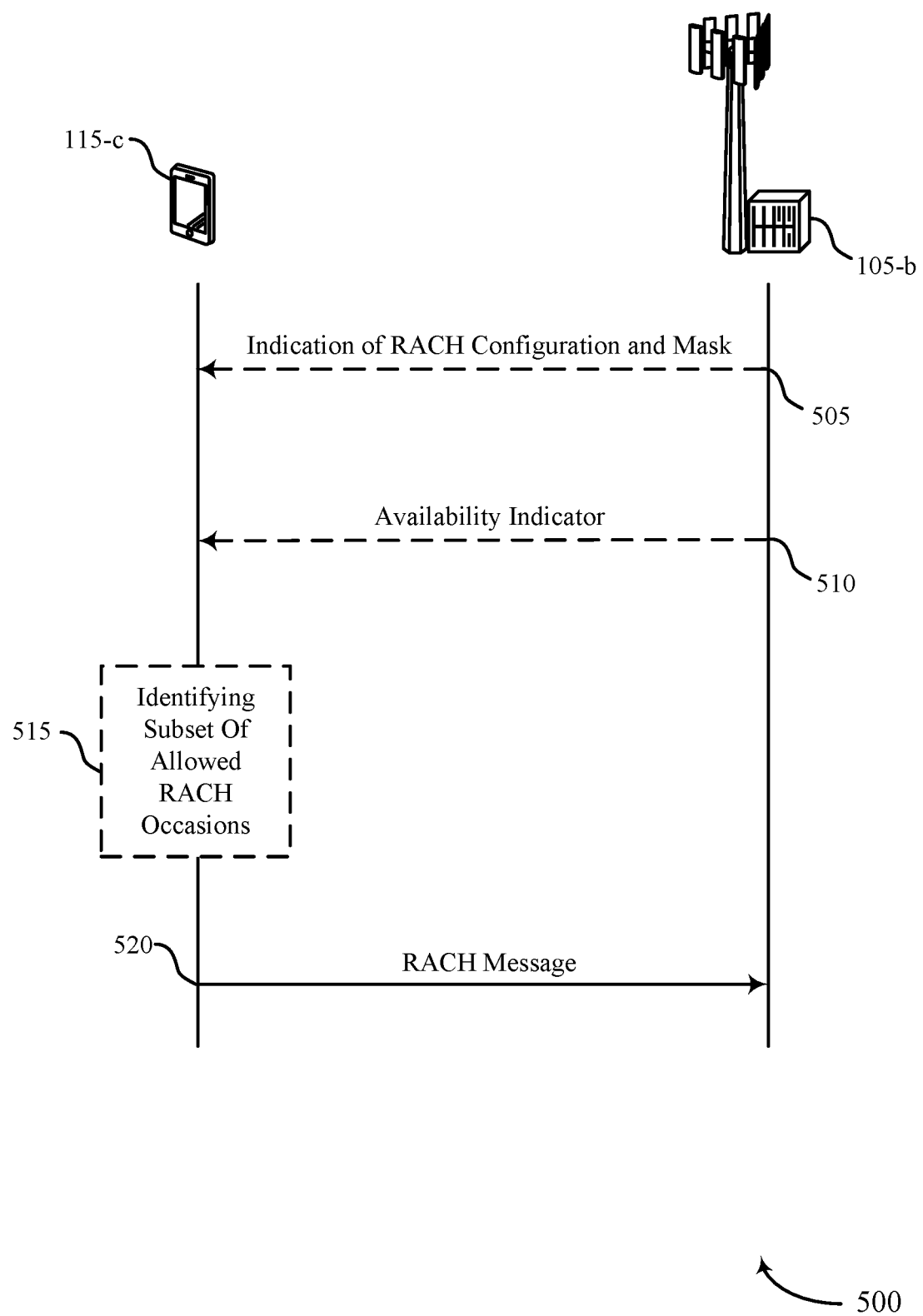
FIG. 5 illustrates an example of a process flow that supports conflict avoidance between random access messages and other transmissions in accordance with aspects of the present disclosure.

FIG. 5 illustrates an example of a process flow 500 that supports conflict avoidance between random access messages and other transmissions in accordance with aspects of the present disclosure. In some examples, process flow 500 may implement aspects of wireless communications systems 100 and 200, as well as transmission configurations 300 and 400. Base station 105-*b* may transmit an indication of RACH configuration and an availability indicator to enable conflict avoidance between RACH transmissions and IIoT transmissions between base station 105-*b*, UE 115-*c*, and transmissions by one or more other UEs 115. Base station 105-*b* may be an example of a base station 105 as described with reference to FIGS. 1-4. UE 115-*c* may be an example of a UE 115 as described with reference to FIGS. 1-4.

In some cases, a base station 105-*b* may be configured to transmit a RACH configuration and a RACH forbidden mask to a UE 115-*c* in order to avoid interference between RACH transmissions by a UE 115 and IIoT transmission by a base station 105. At 505, base station 105-*b* may transmit to one or more UEs 115 (e.g., UE 115-*c*) an indication of a RACH configuration and an indication of a mask associated with the RACH configuration, where the mask indicates a subset of allowed random access occasions from a set of random access occasions indicated by the RACH configuration. Base station 105-*b* may transmit an indication of the mask by transmitting an SIB that indicates the mask.

In these cases, at 505, UE 115-*c* may receive an indication of a RACH configuration and an indication of a mask associated with the RACH configuration. The mask associated with the RACH configuration may be an example of a RACH forbidden mask. Receiving the indication of the mask at 505 may further include receiving an SSB indicating the mask.

Base station 105-*b* may configure a mapping of a set of SSBs and the subset of allowed random access occasions. In other cases, base station 105-*b* may configure a mapping of a set of SSBs to the subset of allowed random access occasions and a subset of forbidden SSBs. Base station 105-*b* may transmit, to the one or more UEs 115, the set of SSBs where one or more SSBs of the set of SSBs indicate the mapping, and where the random access message is received based on the mapping. UE 115-*c* may receive a set of SSBs, and may select an SSB from the set of SSBs based on the signal quality of the SSB. UE 115-*c* may also identify, based on the SSB, a mapping to random access resources corresponding to the allowed random access occasion. The set of SSBs may indicate a mapping between the set of SSBs and the subset of allowed random access occasions. The set of SSBs may also indicate a mapping of the set of SSBs to the subset of the allowed RACH occasions and a subset of forbidden RACH occasions of the set of RACH occasions.

Base station 105-*b* may identify, from the set of random access occasions indicated by the random access channel configuration, a subset of forbidden random access occasions in accordance with the forbidden mask, where the subset of allowed random access occasions is different from the subset of forbidden random access occasions.

At 510, UE 115-*c* may receive DCI including an indication of whether a set of random access occasions are available on a CC, the set of random access occasions corresponding to resources reserved for potential transmission on the CC. Receiving the DCI at 510 may also include receiving the DCI on a second CC that is different from the CC. In some cases, the CC may be associated with a first frequency range (e.g., FR2), and the second CC may be associated with communication in a second frequency range (e.g., FR1) that is difference from the first CC. UE 115-*c* may receive, as part of the DCI, an indication of one or more respective CCs that include the set of one or more random access occasions.

Base station 105-*b* may further broadcast to one or more UEs 115 the DCI on a second CC that is different from the CC. Base station 105-*b* may transmit an indication of one or more respective CCs that include the set of one or more random access occasions. In some cases, one or more of the resources reserved for potential transmission corresponding to the set of one or more random access occasions may be preconfigured. The transmission on one or more of the resources reserved for potential transmission may occur, or may not occur. In other cases, transmission on one or more of the resources reserved for potential transmission includes a retransmission for a failed transmission.

At 515, UE 115-*c* may identify, from a set of RACH occasions indicated by the RACH configuration, a subset of allowed RACH occasions based on the mask. UE 115-*c* may identify, from the set of RACH occasions indicated by the RACH configuration, a subset of allowed RACH occasions based on the forbidden mask. The subset of allowed RACH occasions may be different from the subset of forbidden RACH occasions. Further, the subset of forbidden RACH occasions may correspond to communication resources for one or more UEs 115 or to communications resources including SPS communications, CG communications, DCI based retransmissions resources, or a combination thereof. These may be examples of IIoT transmissions by base station 105-b.

The communications resources may include a periodic transmission pattern for the one or more other UEs 115, where respective allowed RACH occasions of the subset of allowed RACH occasions are non-overlapping with the communications resources.

At 520, UE 115-c may transmit a random access message during at least one allowed RACH occasion of the subset of allowed RACH occasions. At 520, base station 105-b may receive, from UE 115-c or from one or more other UEs 115, a random access message during an allowed random access occasion of the subset of allowed random access occasions.

In other cases, base station 105-b may be configured to transmit an availability indicator to UE 115-c in order to avoid interference between RACH occasion transmissions by UE 115-c and IIoT transmission by base station 105-b. Base station 105-b may determine whether one or more transmissions on a CC were successful. Base station 105-b may, at 510, transmit DCI including an indication of whether a set of random access occasions are available on the CC, the set of random access occasions corresponding to resources reserved for retransmissions on the CC.

At 520, UE 115-c may transmit a random access message during at least one random access occasion of the set based on the DCI indicating that the set of random access occasions are available. UE 115-c may identify an offset between the DCI and a temporally first random access occasion of the set of random access occasions, where transmitting the random access message during at the least one random access occasion is based on the offset.

At 520, base station 105-b may receive, from UE 115-c, a random access message during at least one random access occasion of the set based on the DCI indicating that the set of random access occasions are available. Base station 105-b may identify an offset between the DCI and a temporally first random access occasion of the set of random access occasions, where receiving the random access during at the least one random access occasion is based on the offset.

Figure 6:
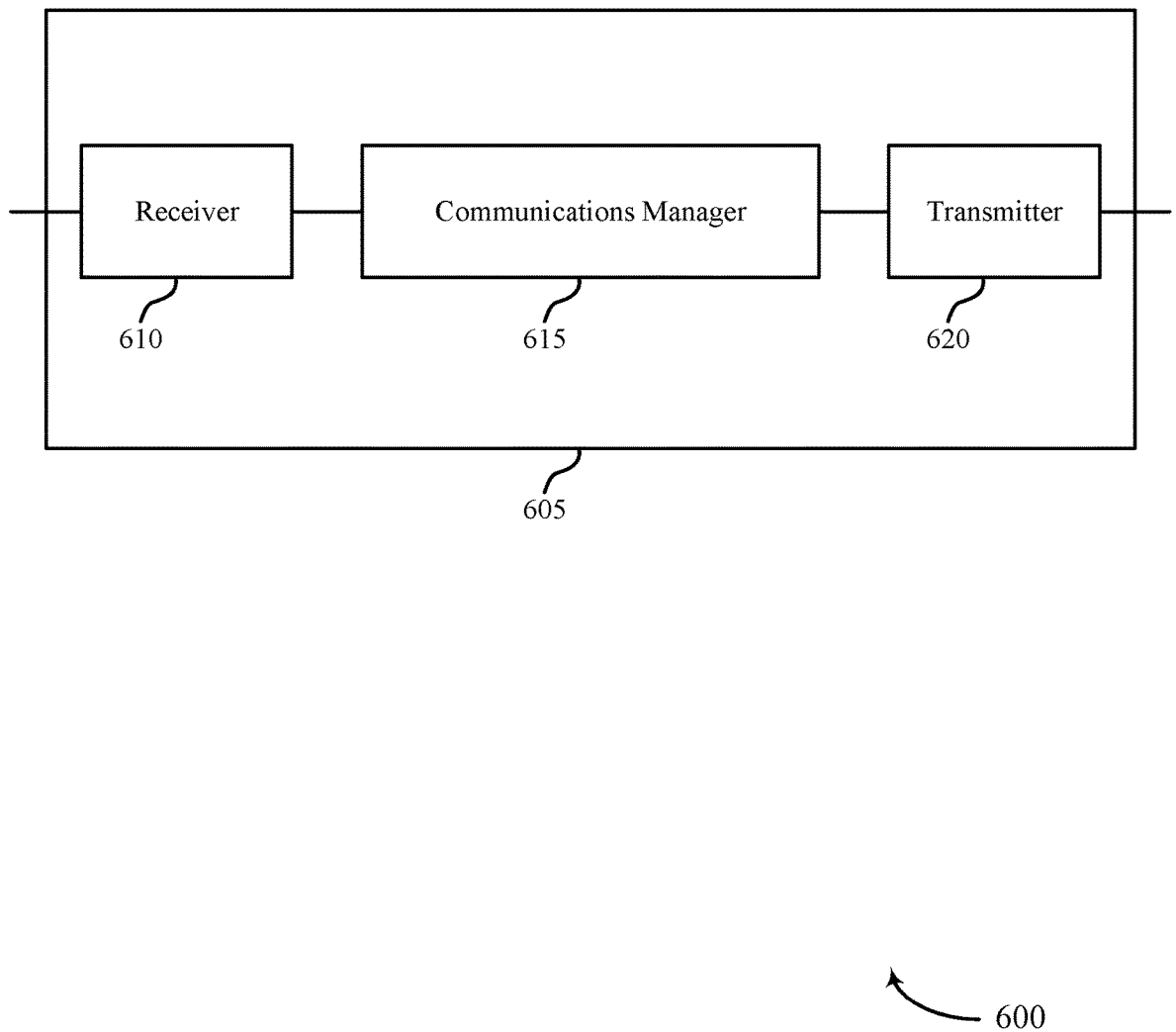
FIGS. 6 and 7 show diagrams of devices that support conflict avoidance between random access messages and other transmissions in accordance with aspects of the present disclosure.

FIG. 6 shows a diagram 600 of a device 605 that supports conflict avoidance between random access messages and other transmissions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to conflict avoidance between random access messages and other transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive an indication of a random access channel configuration and a forbidden mask associated with the random access channel configuration, identify, from a set of random access occasions indicated by the random access channel configuration, a subset of allowed random access occasions based on the forbidden mask, and transmit a random access message during at least one allowed random access occasion of the subset. The communications manager 615 may also receive DCI including an indication of whether a set of random access occasions are available on a component carrier, the set of random access occasions corresponding to resources reserved for potential transmission on the component carrier and transmit a random access message during at least one random access occasion of the set based on the DCI indicating that the set of random access occasions are available. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.) The wireless modem may obtain and decode signals from the receiver 610 over a receive interface, and may output signals for transmission to the transmitter 620 over a transmit interface.

The actions performed by communications manager 615 as described herein may be implemented to realize one or more potential advantages. One implementation may allow for decreased interference in the wireless communications system as described. This implementation may allow a device 605 (e.g., a UE 115) to save power and increase battery life by supporting accurate reception of transmissions by the device 605. The implementation may also increase communications efficiency by decreasing retransmissions from a base station 105, which may in turn increase reliability and decrease latency.

Figure 7:
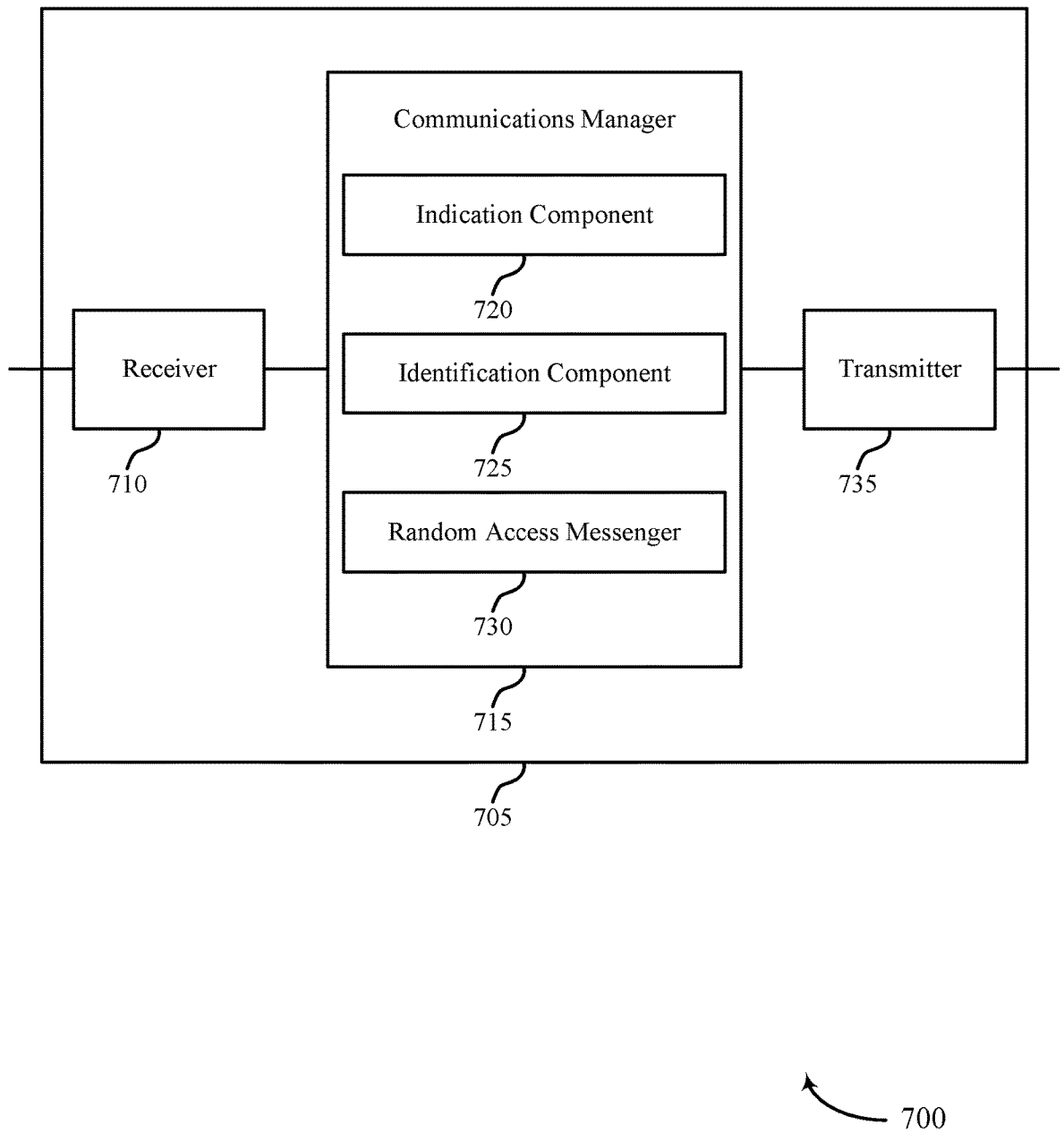

FIG. 7 shows a diagram 700 of a device 705 that supports conflict avoidance between random access messages and other transmissions in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to conflict avoidance between random access messages and other transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a UE indication component 720, a UE identification component 725, and a UE transmission component 730. The communications manager 715 may be an example of aspects of the communications manager 910 described herein.

The UE indication component 720 may receive an indication of a random access channel configuration and a forbidden mask associated with the random access channel configuration.

In some examples, the indication component 720 may receive DCI including an indication of whether a set of random access occasions are available on a component carrier, the set of random access occasions corresponding to resources reserved for potential transmission on the component carrier.

In some examples, the indication component 720 may receive an SIB indicating the forbidden mask. In some examples, the indication component 720 may receive the DCI on a second component carrier that is different from the component carrier. In some examples, the indication component 720 may receive, as part of the DCI, an indication of one or more respective component carriers that include the set of random access occasions.

In some examples, the indication component 720 may receive DCI including an indication of whether a set of random access occasions are available on a component carrier, the set of random access occasions corresponding to resources reserved for potential transmission on the component carrier.

In some cases, the component carrier is associated with communications in a first frequency range. In some cases, the second component carrier is associated with communication in a second frequency range that is different from the first frequency range. In some cases, the resources reserved for potential transmission corresponding to the set of random access occasions are preconfigured. In some cases, one or more of the resources reserved for potential transmission corresponding to the set of one or more random access occasions are preconfigured.

The UE identification component 725 may identify, from a set of random access occasions indicated by the random access channel configuration, a subset of allowed random access occasions based on the forbidden mask. In some examples, the identification component 725 may identify, based on the selected SSB, a mapping to random access resources corresponding to the at least one allowed random access occasion.

In some examples, the identification component 725 may identify, from the set of random access occasions indicated by the random access channel configuration, a subset of forbidden random access occasions in accordance with the forbidden mask, where the subset of allowed random access occasions is different from the subset of forbidden random access occasions.

In some examples, the identification component 725 may identify an offset between the DCI and a temporally first random access occasion of the set of random access occasions, where transmitting the random access message during at the least one random access occasion is based on the offset.

In some cases, the subset of forbidden random access occasions corresponds to communications resources for one or more other UEs, the communications resources including SPS communications resources, CG communications resources, DCI-based retransmission resources, or a combination thereof.

In some cases, the communications resources include a periodic transmission pattern for the one or more other UEs, where respective allowed random access occasions of the subset of allowed random access occasions are non-overlapping with the communications resources.

The UE random access messenger 730 may transmit a random access message during at least one allowed random access occasion of the subset. In some examples, the random access messenger 730 may transmit a random access message during at least one random access occasion of the set based on the DCI indicating that the set of random access occasions are available. In some examples, the random access messenger 730 may transmission on one or more of the resources reserved for potential transmission occurs or does not occur. In some examples, the random access messenger 730 may transmit, on one or more of the resources reserved for potential transmission, a retransmission for a failed transmission.

In some examples, the random access messenger 730 may transmit a random access message during at least one random access occasion of the set based on the DCI indicating that the set of random access occasions are available.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a UE 115 (e.g., processor 940 as described with reference to FIG. 9) may efficiently determine when to transmit in RACH occasion slots based on information received from a base station 105. The information may include the RACH forbidden mask or the DCI, and may be received by the UE 115 via an indication component 720. The determination made by the processor of the UE 115 may improve the efficiency of the UE 115 and may provide increased reliability and improved reception for transmissions made by the UE 115.

Figure 8:
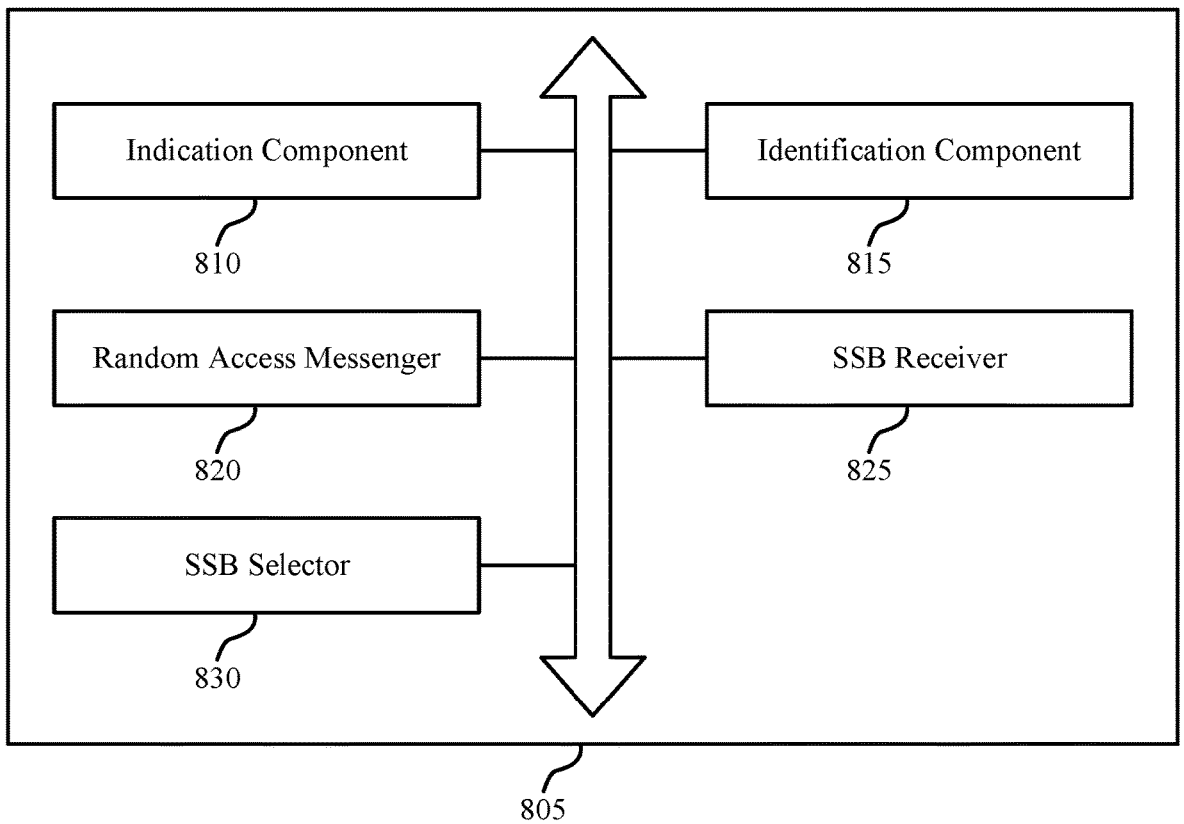
FIG. 8 shows a diagram of a communications manager that supports conflict avoidance between random access messages and other transmissions in accordance with aspects of the present disclosure.

FIG. 8 shows a diagram 800 of a communications manager 805 that supports conflict avoidance between random access messages and other transmissions in accordance with aspects of the present disclosure. The communications manager 805 may be an example of aspects of a communications manager 615, a communications manager 715, or a communications manager 910 described herein. The communications manager 805 may include an indication component 810, an identification component 815, a random access messenger 820, an SSB receiver 825, and an SSB selector 830. Each of these modules may communicate, directly or indirectly, with one another (e.g., via one or more buses).

The indication component 810 may receive an indication of a random access channel configuration and a forbidden mask associated with the random access channel configuration. In some examples, the indication component 810 may receive DCI including an indication of whether a set of random access occasions are available on a component carrier, the set of random access occasions corresponding to resources reserved for retransmissions on the component carrier. In some aspects, the indication component 810 may receive an SIB indicating the forbidden mask. In some examples, the indication component 810 may receive the DCI on a second component carrier that is different from the component carrier.

In some examples, the indication component 810 may receive, as part of the DCI, an indication of one or more respective component carriers that include the set of random access occasions. In some cases, a first component carrier is associated with communications in a first frequency range and a second component carrier is associated with communication in a second frequency range that is different from the first frequency range. In some aspects, one or more of the resources reserved for potential transmission corresponding to the set of one or more random access occasions are preconfigured.

The identification component 815 may identify, from a set of random access occasions indicated by the random access channel configuration, a subset of allowed random access occasions based on the forbidden mask. In some examples, the identification component 815 may identify, based on the selected SSB, a mapping to random access resources corresponding to the at least one allowed random access occasion. In some examples, the identification component 815 may identify, from the set of random access occasions indicated by the random access channel configuration, a subset of forbidden random access occasions in accordance with the forbidden mask, where the subset of allowed random access occasions is different from the subset of forbidden random access occasions.

In some aspects, the identification component 815 may identify an offset between the DCI and a temporally first random access occasion of the set of random access occasions, where transmitting the random access message during at the least one random access occasion is based on the offset.

In some cases, the subset of forbidden random access occasions corresponds to communications resources for one or more other UEs, the communications resources including semi-persistently scheduled communications resources, CG communications resources, DCI-based retransmission resources, or a combination thereof. In some cases, the communications resources include a periodic transmission pattern for the one or more other UEs, where respective allowed random access occasions of the subset of allowed random access occasions are non-overlapping with the communications resources.

The random access messenger 820 may transmit a random access message during at least one allowed random access occasion of the subset. In some examples, the random access messenger 820 may transmit a random access message during at least one random access occasion of the set based on the DCI indicating that the set of random access occasions are available. In some cases, the transmission on one or more of the resources reserved for potential transmission occurs or does not occur. In some examples, the transmission on one or more of the resources reserved for potential transmission includes a retransmission for a failed transmission.

The SSB receiver 825 may receive a set of SSBs. In some cases, the set of synchronization signal blocks indicate a mapping between the set of SSBs and the subset of allowed random access occasions. In some cases, the set of SSBs indicate a mapping of the set of SSBs to the subset of allowed random access occasions and a subset of forbidden random access occasions of the set of random access occasions.

The SSB selector 830 may select a SSB from the set of SSBs based on a signal quality of the SSB.

Figure 9:
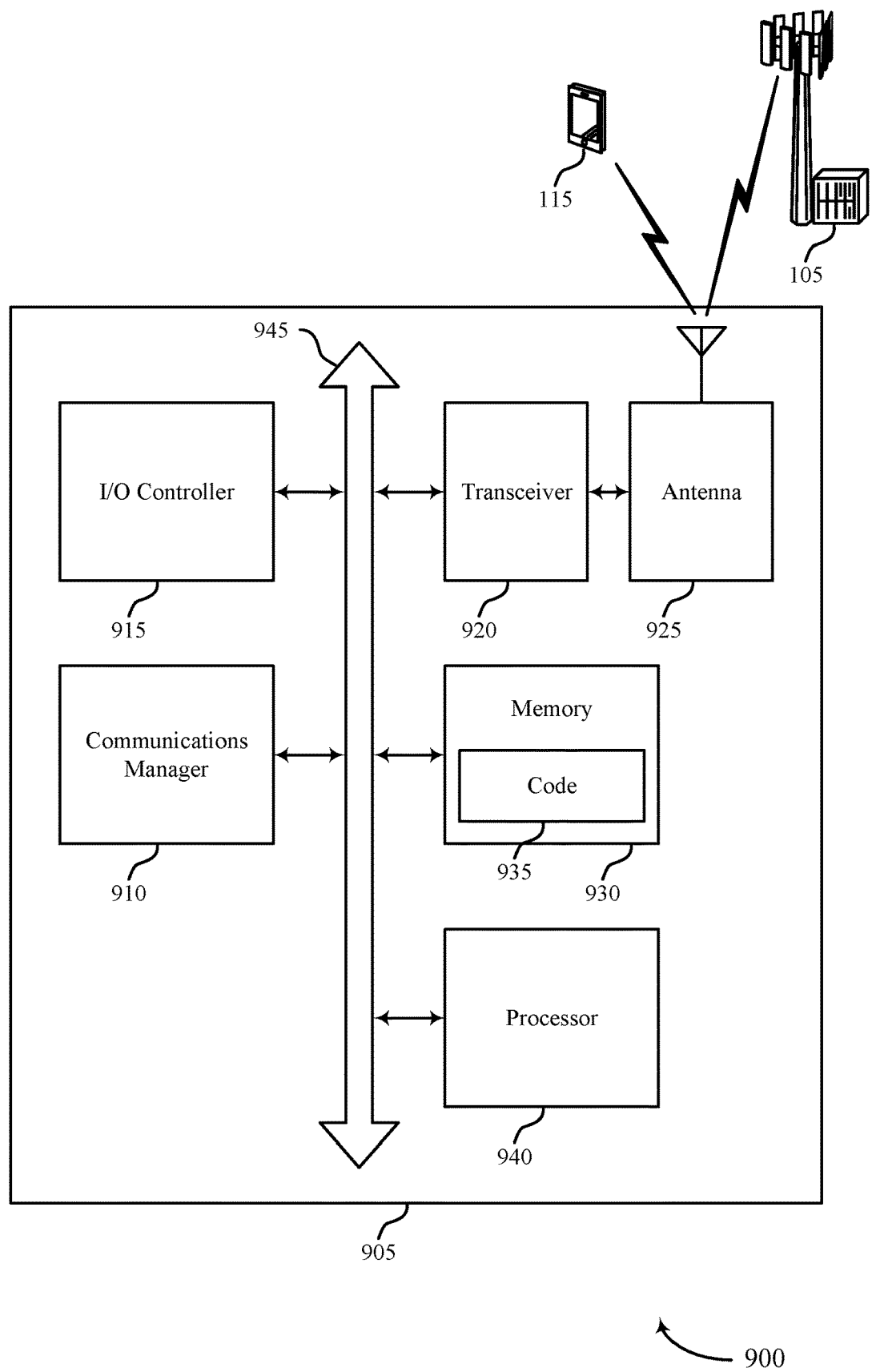
FIG. 9 shows a diagram of a system including a device that supports conflict avoidance between random access messages and other transmissions in accordance with aspects of the present disclosure.

FIG. 9 shows a diagram of a system 900 including a device 905 that supports conflict avoidance between random access messages and other transmissions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive an indication of a random access channel configuration and a forbidden mask associated with the random access channel configuration, identify, from a set of random access occasions indicated by the random access channel configuration, a subset of allowed random access occasions based on the forbidden mask, and transmit a random access message during at least one allowed random access occasion of the subset. The communications manager 910 may also receive DCI including an indication of whether a set of random access occasions are available on a component carrier, the set of random access occasions corresponding to resources reserved for potential transmission on the component carrier and transmit a random access message during at least one random access occasion of the set based on the DCI indicating that the set of random access occasions are available.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting conflict avoidance between random access messages and other transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
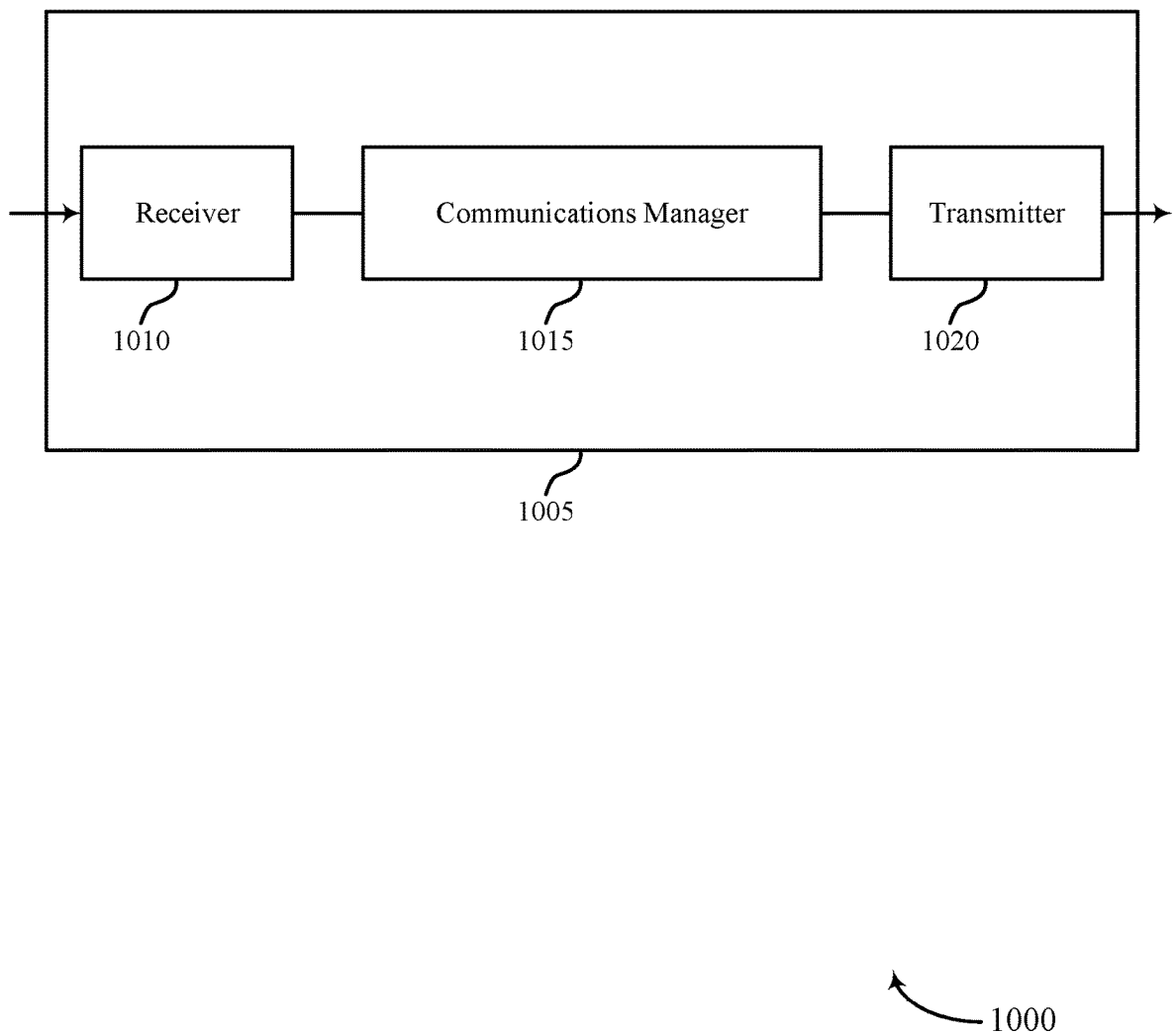
FIGS. 10 and 11 show diagrams of devices that support conflict avoidance between random access messages and other transmissions in accordance with aspects of the present disclosure.

FIG. 10 shows a diagram 1000 of a device 1005 that supports conflict avoidance between random access messages and other transmissions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to conflict avoidance between random access messages and other transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to one or more UEs, an indication of a random access channel configuration and a forbidden mask associated with the random access channel configuration, where the forbidden mask indicates a subset of allowed random access occasions from a set of random access occasions indicated by the random access channel configuration and receive, from a UE of the one or more UEs, a random access message during at least one allowed random access occasion of the subset. The communications manager 1015 may also determine whether one or more transmissions on a component carrier were successful, transmit DCI including an indication of whether a set of random access occasions are available on the component carrier, the set of random access occasions corresponding to resources reserved for potential transmission on the component carrier, where the indication is based on the determination, and receive, from a UE, a random access message during at least one random access occasion of the set based on the DCI indicating that the set of random access occasions are available. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
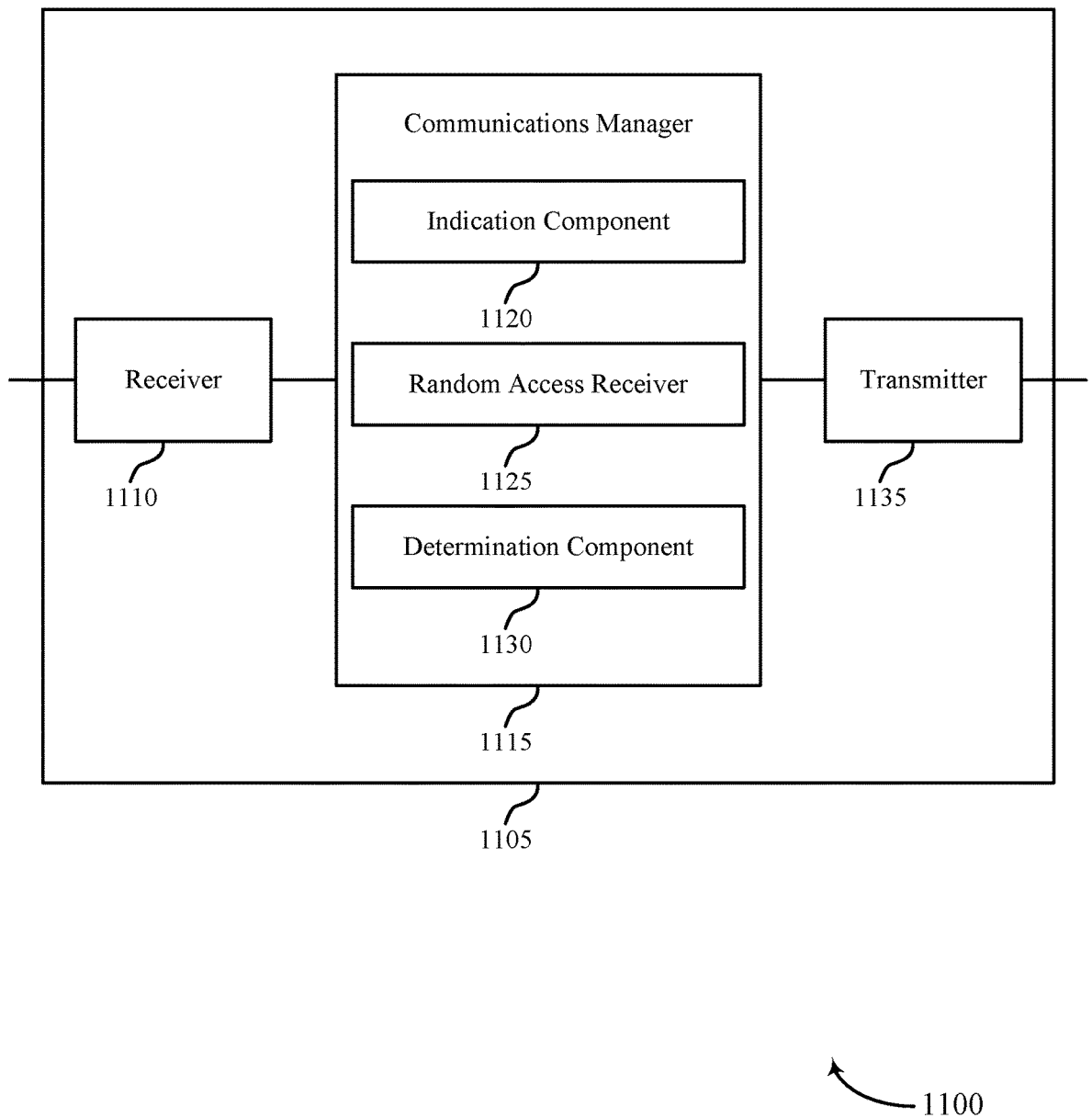

FIG. 11 shows a diagram 1100 of a device 1105 that supports conflict avoidance between random access messages and other transmissions in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to conflict avoidance between random access messages and other transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an indication component 1120, a random access receiver 1125, and a determination component 1130. The communications manager 1115 may be an example of aspects of the communications manager 1310 described herein.

The indication component 1120 may transmit, to one or more UEs, an indication of a random access channel configuration and a forbidden mask associated with the random access channel configuration, where the forbidden mask indicates a subset of allowed random access occasions from a set of random access occasions indicated by the random access channel configuration. The indication component 1120 may transmit DCI including an indication of whether a set of random access occasions are available on the component carrier, the set of random access occasions corresponding to resources reserved for potential transmission on the component carrier, where the indication is based on the determination.

The random access receiver 1125 may receive, from a UE of the one or more UEs, a random access message during at least one allowed random access occasion of the subset. The random access receiver 1125 may receive, from a UE, a random access message during at least one random access occasion of the set based on the DCI indicating that the set of random access occasions are available.

The determination component 1130 may determine whether one or more transmissions on a component carrier were successful.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
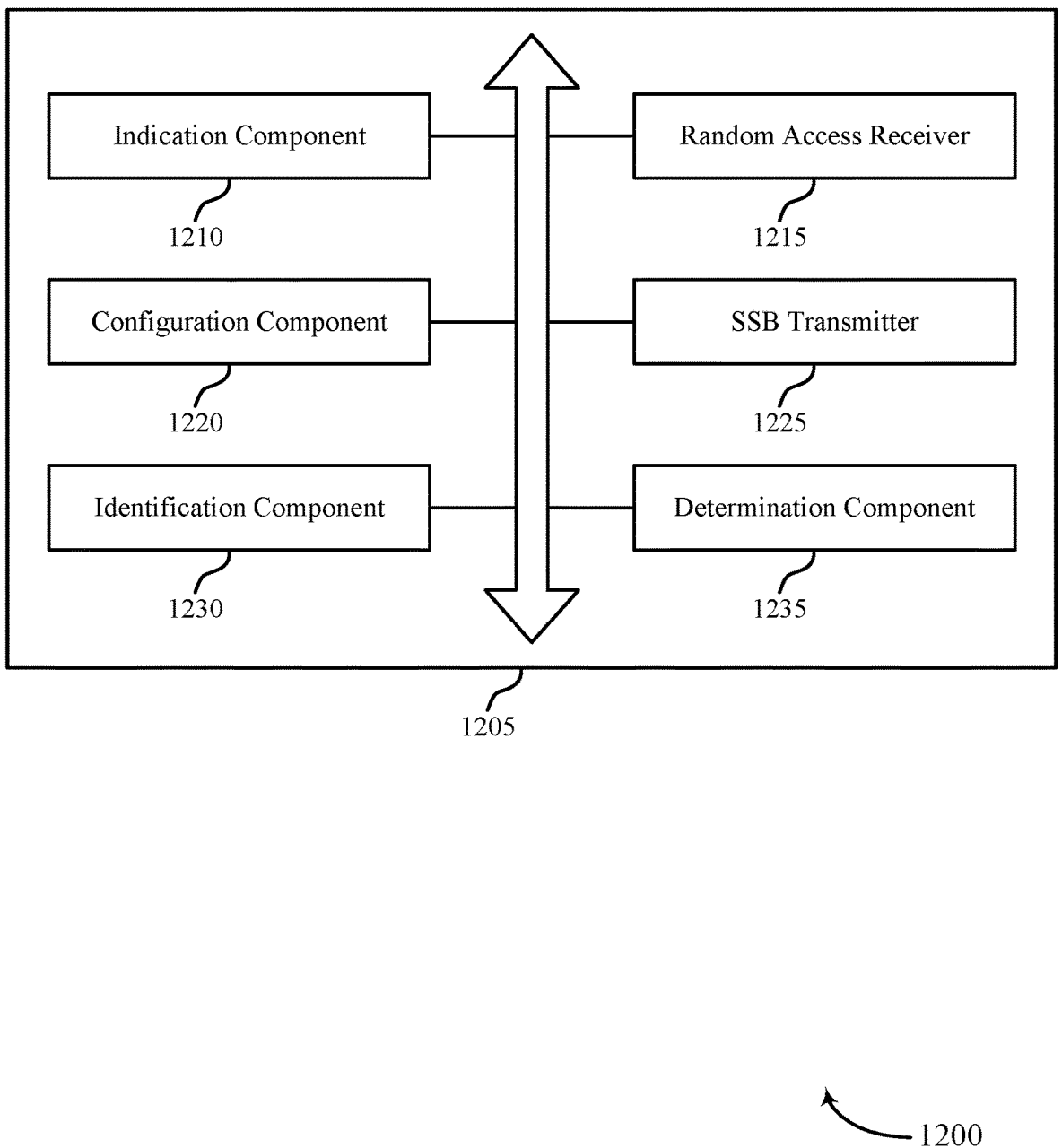
FIG. 12 shows a diagram of a communications manager that supports conflict avoidance between random access messages and other transmissions in accordance with aspects of the present disclosure.

FIG. 12 shows a diagram 1200 of a communications manager 1205 that supports conflict avoidance between random access messages and other transmissions in accordance with aspects of the present disclosure. The communications manager 1205 may be an example of aspects of a communications manager 1015, a communications manager 1115, or a communications manager 1310 described herein. The communications manager 1205 may include an indication component 1210, a random access receiver 1215, a configuration component 1220, an SSB transmitter 1225, an identification component 1230, and a determination component 1235. Each of these modules may communicate, directly or indirectly, with one another (e.g., via one or more buses).

The indication component 1210 may transmit, to one or more UEs, an indication of a random access channel configuration and a forbidden mask associated with the random access channel configuration, where the forbidden mask indicates a subset of allowed random access occasions from a set of random access occasions indicated by the random access channel configuration.

In some examples, the indication component 1210 may transmit DCI including an indication of whether a set of random access occasions are available on the component carrier, the set of random access occasions corresponding to resources reserved for potential transmission on the component carrier, where the indication is based on the determination. In some examples, the indication component 1210 may transmit an SIB that indicates the forbidden mask.

In some examples, the indication component 1210 may broadcast, to one or more UEs, the DCI on a second component carrier that is different from the component carrier.

In some examples, the indication component 1210 may transmit, as part of the DCI, an indication of one or more respective component carriers that include the set of random access occasions. In some cases, the component carrier is associated with communications in a first frequency range. In some cases, the second component carrier is associated with communication in a second frequency range that is different from the first frequency range. In some cases, the resources reserved for potential transmission corresponding to the set of random access occasions are preconfigured.

The random access receiver 1215 may receive, from a UE of the one or more UEs, a random access message during at least one allowed random access occasion of the subset. In some examples, the random access receiver 1215 may receive, from a UE, a random access message during at least one random access occasion of the set based on the DCI indicating that the set of random access occasions are available.

The determination component 1235 may determine whether one or more transmissions on a component carrier were successful. In some cases, the one or more transmissions include semi-persistently scheduled communications, CG communications, or a combination thereof.

The configuration component 1220 may configure a mapping between a set of SSBs and the subset of allowed random access occasions. In some examples, the configuration component 1220 may configure a mapping of a set of SSBs to the subset of allowed random access occasions and a subset of forbidden SSBs.

The SSB transmitter 1225 may transmit, to the one or more UEs, the set of SSBs, where SSBs of the set of SSBs indicate the mapping, and where the random access message is received based on the mapping.

The identification component 1230 may identify, from the set of random access occasions indicated by the random access channel configuration, a subset of forbidden random access occasions, where the subset of allowed random access occasions is different from the subset of forbidden random access occasions. In some examples, the identification component 1230 may identify an offset between the DCI and a temporally first random access occasion of the set of random access occasions, where receiving the random access message during at the least one random access occasion is based on the offset. In some cases, the subset of forbidden random access occasions corresponds to communications resources for one or more other UEs, the communications resources including semi-persistently scheduled communications resources, CG communications resources, DCI-based retransmission resources, or a combination thereof. In some cases, the communications resources include a periodic transmission pattern for the one or more other UEs, and where respective allowed random access occasions of the subset of allowed random access occasions are non-overlapping with the communications resources.

Figure 13:
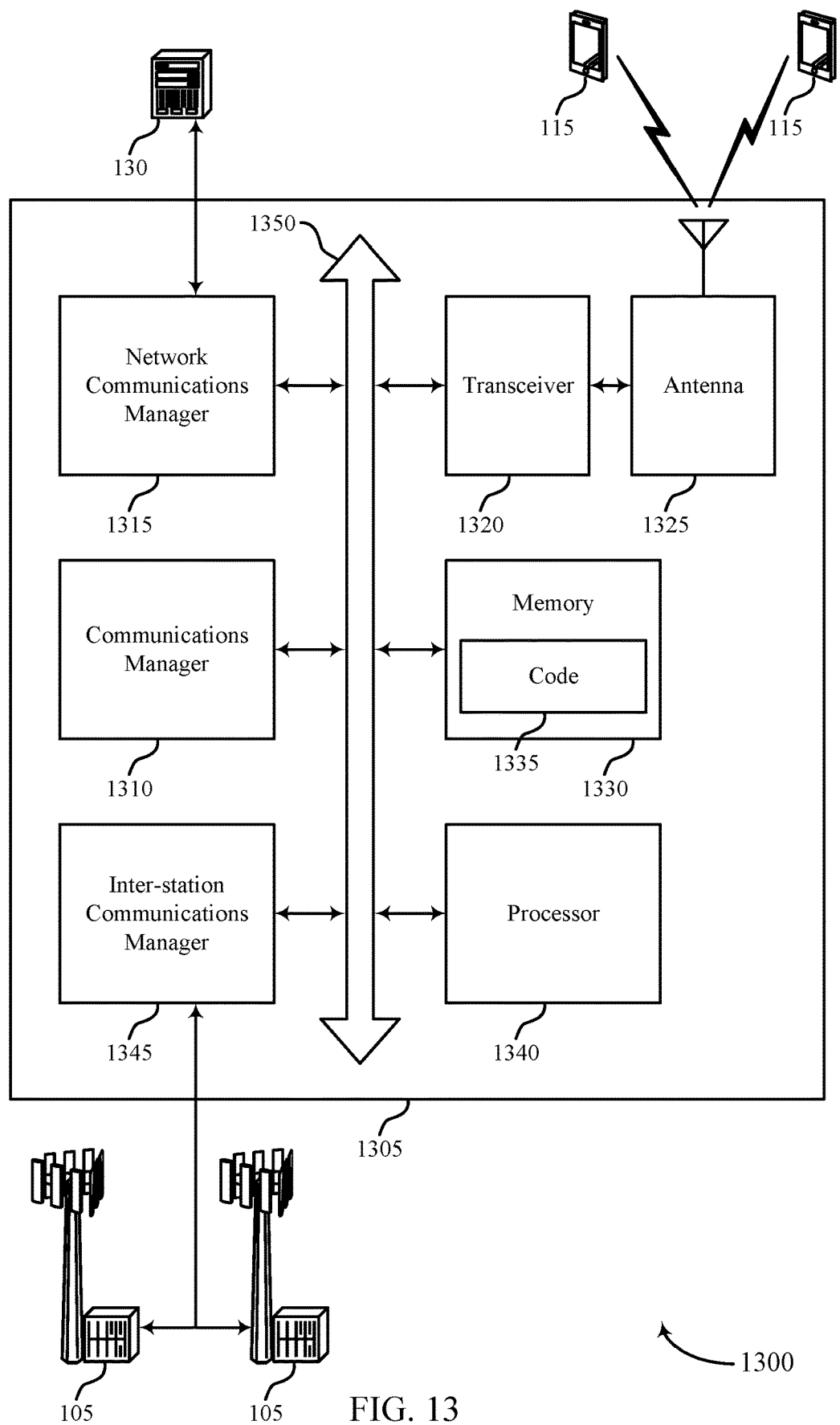
FIG. 13 shows a diagram of a system including a device that supports conflict avoidance between random access messages and other transmissions in accordance with aspects of the present disclosure.

FIG. 13 shows a diagram of a system 1300 including a device 1305 that supports conflict avoidance between random access messages and other transmissions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in communication via one or more buses (e.g., bus 1350).

The communications manager 1310 may transmit, to one or more UEs, an indication of a random access channel configuration and a forbidden mask associated with the random access channel configuration, where the forbidden mask indicates a subset of allowed random access occasions from a set of random access occasions indicated by the random access channel configuration and receive, from a UE of the one or more UEs, a random access message during at least one allowed random access occasion of the subset. The communications manager 1310 may also determine whether one or more transmissions on a component carrier were successful, transmit DCI including an indication of whether a set of random access occasions are available on the component carrier, the set of random access occasions corresponding to resources reserved for potential transmission on the component carrier, where the indication is based on the determination, and receive, from a UE, a random access message during at least one random access occasion of the set based on the DCI indicating that the set of random access occasions are available.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting conflict avoidance between random access messages and other transmissions).

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
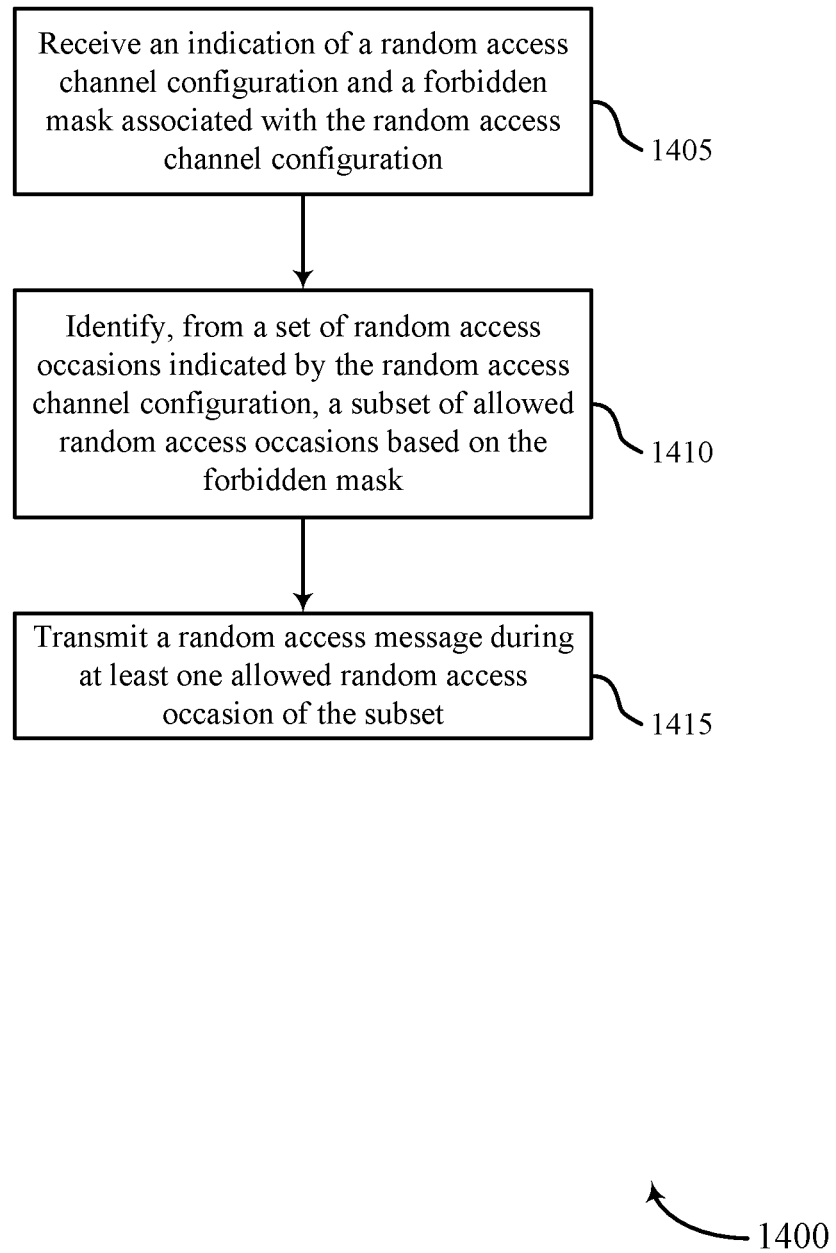
FIGS. 14 through 17 show flowcharts illustrating methods that support conflict avoidance between random access messages and other transmissions in accordance with aspects of the present disclosure.

FIG. 14 shows a flowchart illustrating a method 1400 that supports conflict avoidance between random access messages and other transmissions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive an indication of a random access channel configuration and a forbidden mask associated with the random access channel configuration. The operations of 1405 may be performed according to the methods described herein. In some examples, aspects of the operations of 1405 may be performed by a UE reception component as described with reference to FIGS. 6 through 9.

At 1410, the UE may identify, from a set of random access occasions indicated by the random access channel configuration, a subset of allowed random access occasions based on the forbidden mask. The operations of 1410 may be performed according to the methods described herein. In some examples, aspects of the operations of 1410 may be performed by a UE identification component as described with reference to FIGS. 6 through 9.

At 1415, the UE may transmit a random access message during at least one allowed random access occasion of the subset. The operations of 1415 may be performed according to the methods described herein. In some examples, aspects of the operations of 1415 may be performed by a UE transmission component as described with reference to FIGS. 6 through 9.

Figure 15:
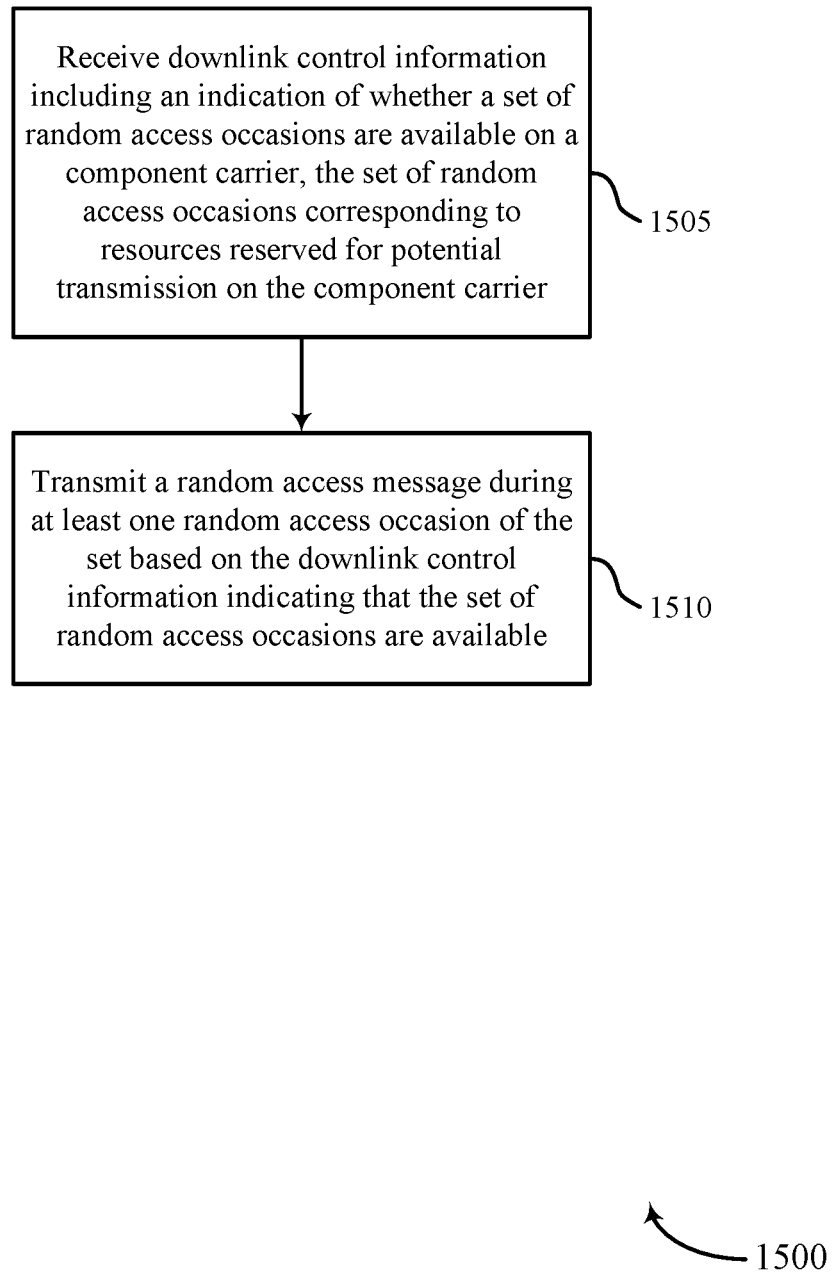

FIG. 15 shows a flowchart illustrating a method 1500 that supports conflict avoidance between random access messages and other transmissions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive DCI including an indication of whether a set of random access occasions are available on a component carrier, the set of random access occasions corresponding to resources reserved for potential transmission on the component carrier. The operations of 1505 may be performed according to the methods described herein. In some examples, aspects of the operations of 1505 may be performed by a base station reception component as described with reference to FIGS. 6 through 9.

At 1510, the UE may transmit a random access message during at least one random access occasion of the set based on the DCI indicating that the set of random access occasions are available. The operations of 1510 may be performed according to the methods described herein. In some examples, aspects of the operations of 1510 may be performed by a base station transmission component as described with reference to FIGS. 6 through 9.

Figure 16:
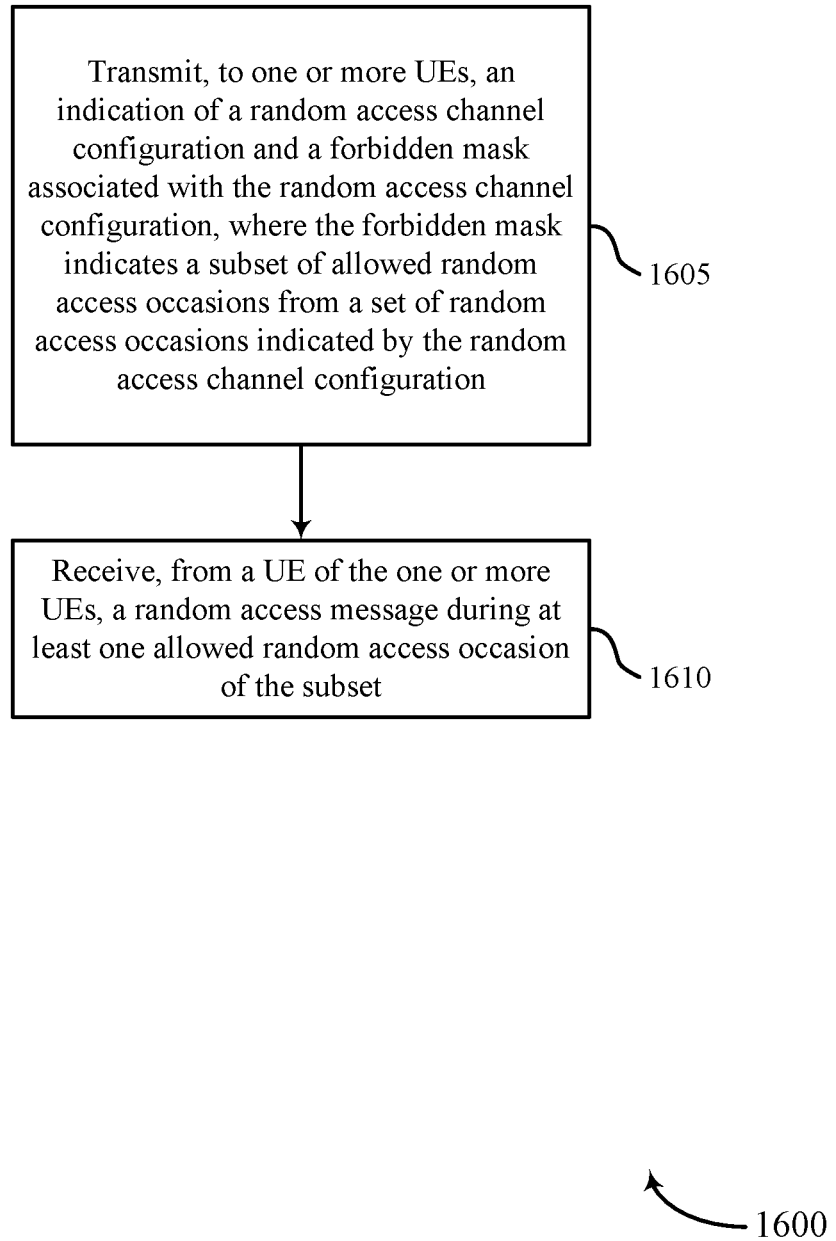

FIG. 16 shows a flowchart illustrating a method 1600 that supports conflict avoidance between random access messages and other transmissions in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to one or more UEs, an indication of a random access channel configuration and a forbidden mask associated with the random access channel configuration, where the forbidden mask indicates a subset of allowed random access occasions from a set of random access occasions indicated by the random access channel configuration. The operations of 1605 may be performed according to the methods described herein. In some examples, aspects of the operations of 1605 may be performed by a base station transmission component as described with reference to FIGS. 10 through 13.

At 1610, the base station may receive, from a UE of the one or more UEs, a random access message during at least one allowed random access occasion of the subset. The operations of 1610 may be performed according to the methods described herein. In some examples, aspects of the operations of 1610 may be performed by a base station reception component as described with reference to FIGS. 10 through 13.

Figure 17:
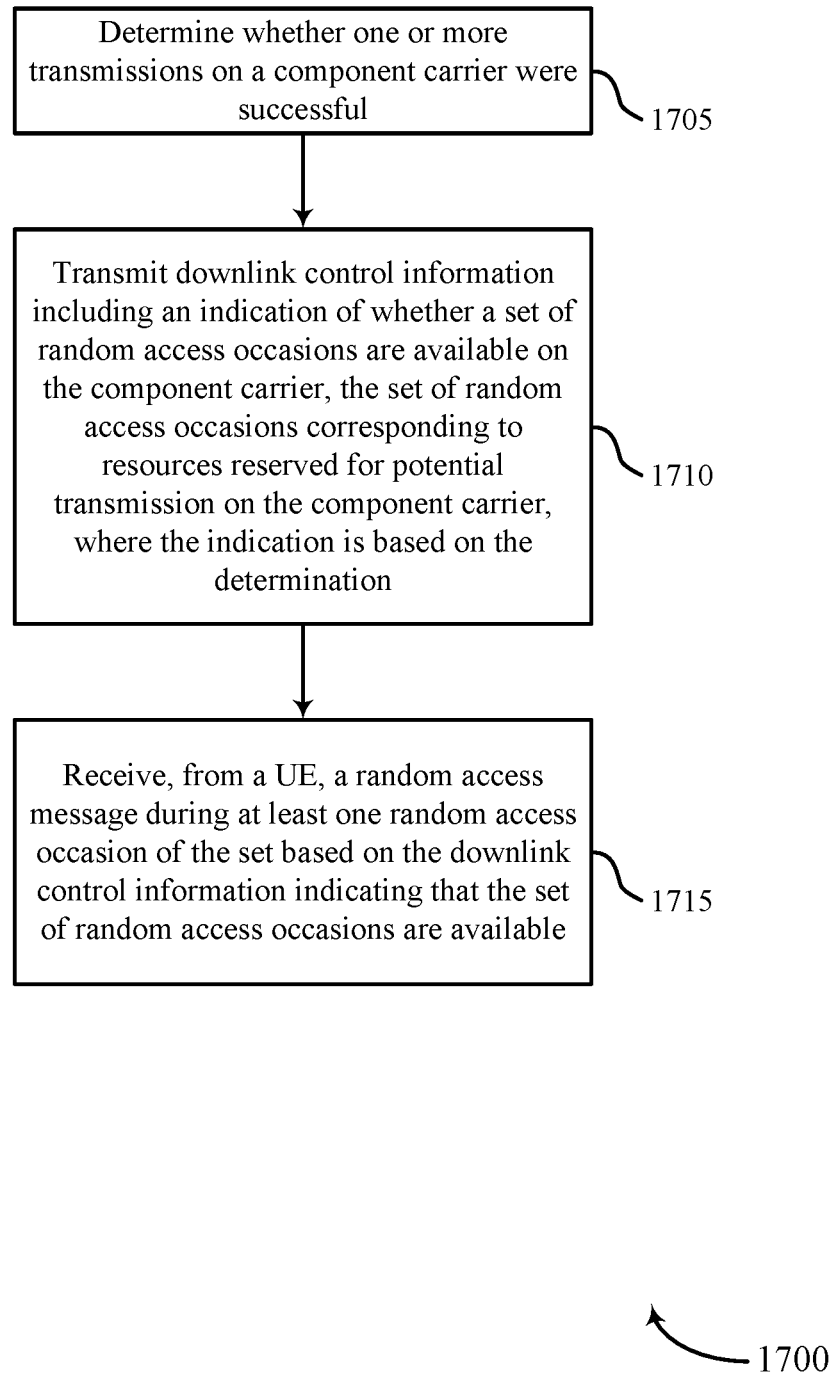

FIG. 17 shows a flowchart illustrating a method 1700 that supports conflict avoidance between random access messages and other transmissions in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may determine whether one or more transmissions on a component carrier were successful. The operations of 1705 may be performed according to the methods described herein. In some examples, aspects of the operations of 1705 may be performed by a determination component as described with reference to FIGS. 10 through 13.

At 1710, the base station may transmit DCI including an indication of whether a set of random access occasions are available on the component carrier, the set of random access occasions corresponding to resources reserved for potential transmission on the component carrier, where the indication is based on the determination. The operations of 1710 may be performed according to the methods described herein. In some examples, aspects of the operations of 1710 may be performed by a base station transmission component as described with reference to FIGS. 10 through 13.

At 1715, the base station may receive, from a UE, a random access message during at least one random access occasion of the set based on the DCI indicating that the set of random access occasions are available. The operations of 1715 may be performed according to the methods described herein. In some examples, aspects of the operations of 1715 may be performed by a base station reception component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving an allocation of a set of resources, on a component carrier, reserved for at least one retransmission of an initial transmission;
   indicating or receiving an indication that the initial transmission was successful;
   based at least in part on the indication that the initial transmission was successful, receiving downlink control information comprising an indication that a set of random access occasions is available on the component carrier, the set of random access occasions corresponding to at least a portion of the set of resources reserved for the at least one retransmission on the component carrier; and
   transmitting a random access message during at least one random access occasion of the set of random access occasions based at least in part on the downlink control information indicating that the set of random access occasions is available.

2. The method of claim 1, wherein receiving the downlink control information comprises:
   receiving the downlink control information on a second component carrier that is different from the component carrier.

3. The method of claim 2, wherein:
   the component carrier is associated with communications in a first frequency range; and
   the second component carrier is associated with communication in a second frequency range that is different from the first frequency range.

4. The method of claim 1, further comprising:
   receiving, as part of the downlink control information, an indication of one or more respective component carriers that include the set of random access occasions.

5. The method of claim 1, further comprising:
   identifying an offset between the downlink control information and a temporally first random access occasion of the set of random access occasions, wherein transmitting the random access message during the at least one random access occasion is based at least in part on the offset.

6. The method of claim 1, wherein one or more of the set of resources reserved for the at least one retransmission are configured for semi-persistent scheduled (SPS) or configured grant (CG) communications.

7. The method of claim 1, wherein transmission on one or more of the resources reserved for the at least one retransmission does not occur.

8. A method for wireless communication at a base station, comprising:
   allocating a set of resources, on a component carrier, reserved for at least one retransmission of one or more initial transmissions;
   determining that the one or more initial transmissions on the component carrier were successful;
   based at least in part on the determination that the one or more initial transmissions was successful, transmitting downlink control information comprising an indication that a set of random access occasions is available on the component carrier, the set of random access occasions corresponding to at least a portion of the set of resources reserved for the at least one retransmission on the component carrier; and
   receiving, from a user equipment (UE), a random access message during at least one random access occasion of the set of random access occasions based at least in part on the downlink control information indicating that the set of random access occasions is available.

9. The method of claim 8, wherein transmitting the downlink control information comprises:
   broadcasting, to one or more UEs, the downlink control information on a second component carrier that is different from the component carrier.

10. The method of claim 9, wherein:
    the component carrier is associated with communications in a first frequency range; and
    the second component carrier is associated with communication in a second frequency range that is different from the first frequency range.

11. The method of claim 8, further comprising:
    transmitting, as part of the downlink control information, an indication of one or more respective component carriers that include the set of random access occasions.

12. The method of claim 8, further comprising:
    identifying an offset between the downlink control information and a temporally first random access occasion of the set of random access occasions, wherein receiving the random access message during the at least one random access occasion is based at least in part on the offset.

13. The method of claim 8, wherein the one or more initial transmissions comprise semi-persistently scheduled communications, configured grant communications, or a combination thereof.

14. An apparatus for wireless communication at a user equipment (UE), comprising:
    a processor; and
    a memory coupled with the processor, wherein the memory comprises instructions executable by the processor to cause the apparatus to:

receive an allocation of a set of resources, on a component carrier, reserved for at least one retransmission of an initial transmission;

indicate or receive an indication that the initial transmission was successful;

based at least in part on the indication that the initial transmission was successful, receive downlink control information comprising an indication that a set of random access occasions is available on the component carrier, the set of random access occasions corresponding to at least a portion of the set of resources reserved for the at least one retransmission on the component carrier; and transmit a random access message during at least one random access occasion of the set of random access occasions based at least in part on the downlink control information indicating that the set of random access occasions is available.

15. The apparatus of claim 14, wherein the instructions are further executable by the processor to cause the apparatus to:

receive the downlink control information on a second component carrier that is different from the component carrier.

16. The apparatus of claim 15, wherein:

the component carrier is associated with communications in a first frequency range; and the second component carrier is associated with communication in a second frequency range that is different from the first frequency range.

17. The apparatus of claim 14, wherein the instructions are further executable by the processor to cause the apparatus to:

receive, as part of the downlink control information, an indication of one or more respective component carriers that include the set of random access occasions.

18. The apparatus of claim 14, wherein the instructions are further executable by the processor to cause the apparatus to:

identify an offset between the downlink control information and a temporally first random access occasion of the set of random access occasions, wherein transmitting the random access message during the at least one random access occasion is based at least in part on the offset.

19. The apparatus of claim 14, wherein one or more of the set of resources reserved for the at least one retransmission are configured for semi-persistent scheduled (SPS) or configured grant (CG) communications.

20. The apparatus of claim 14, wherein transmission on one or more of the resources reserved for the at least one retransmission does not occur.

21. An apparatus for wireless communication at a base station, comprising:

a processor; and a memory coupled with the processor, wherein the memory comprises instructions executable by the processor to cause the apparatus to:

allocate a set of resources, on a component carrier, reserved for at least one retransmission of one or more initial transmissions;

determine that the one or more initial transmissions on the component carrier were successful;

based at least in part on the determination that the one or more initial transmissions was successful, transmit downlink control information comprising an indication that a set of random access occasions is available on the component carrier, the set of random access occasions corresponding to at least a portion of the set of resources reserved for the at least one retransmission on the component carrier; and receive, from a user equipment (UE), a random access message during at least one random access occasion of the set of random access occasions based at least in part on the downlink control information indicating that the set of random access occasions is available.

22. The apparatus of claim 21, wherein the instructions are further executable by the processor to cause the apparatus to:

broadcast, to one or more UEs, the downlink control information on a second component carrier that is different from the component carrier.

23. The apparatus of claim 22, wherein:

the component carrier is associated with communications in a first frequency range; and the second component carrier is associated with communication in a second frequency range that is different from the first frequency range.

24. The apparatus of claim 21, wherein the instructions are further executable by the processor to cause the apparatus to:

transmit, as part of the downlink control information, an indication of one or more respective component carriers that include the set of random access occasions.

25. The apparatus of claim 21, wherein the instructions are further executable by the processor to cause the apparatus to:

identify an offset between the downlink control information and a temporally first random access occasion of the set of random access occasions, wherein receiving the random access message during the at least one random access occasion is based at least in part on the offset.

26. The apparatus of claim 21, wherein the one or more initial transmissions comprise semi-persistently scheduled communications, configured grant communications, or a combination thereof.

* * * * *